(12) United States Patent
Hoffman et al.

(10) Patent No.: US 9,502,005 B2
(45) Date of Patent: Nov. 22, 2016

(54) GUITAR NECK JOINT ROUTING SYSTEM

(71) Applicant: C.F. Martin & Co., Inc., Nazareth, PA (US)

(72) Inventors: Theresa L. Hoffman, Wind Gap, PA (US); Christian P. Destremps, Mount Laurel, NJ (US); Andrew W. Levan, Moorestown, NJ (US); Michael J. Mosley, Princeton, NJ (US); David Sharper, Warminster, PA (US); William S. Jones, Johnson City, TN (US)

(73) Assignee: Dreadnought, Inc., Wilmington, DE (US)

( * ) Notice: Subject to any disclaimer, the term of this patent is extended or adjusted under 35 U.S.C. 154(b) by 259 days.

(21) Appl. No.: 14/477,123

(22) Filed: Sep. 4, 2014

(65) Prior Publication Data

US 2014/0373977 A1 Dec. 25, 2014

Related U.S. Application Data

(62) Division of application No. 13/408,456, filed on Feb. 29, 2012, now Pat. No. 8,940,985.

(51) Int. Cl.
| | |
|---|---|
| *G10D 1/00* | (2006.01) |
| *B27F 1/08* | (2006.01) |
| *B27C 9/04* | (2006.01) |

(Continued)

(52) U.S. Cl.
CPC .......... *G10D 1/005* (2013.01); *B23K 26/0093* (2013.01); *B23K 26/38* (2013.01); *B23K 37/02* (2013.01); *B23K 37/0435* (2013.01); *B27C 9/04* (2013.01); *B27F 1/08* (2013.01); *B27M 3/00* (2013.01); *G01B 5/20* (2013.01); *G10D 1/08* (2013.01); *G10D 3/06* (2013.01); *Y10T 409/303752* (2015.01); *Y10T 409/303864* (2015.01); *Y10T 409/307728* (2015.01); *Y10T 409/307784* (2015.01)

(58) Field of Classification Search
CPC .......... G10D 3/06; G10D 1/08; G10D 1/085; G10D 3/00; G10D 1/00; G10D 3/14; Y10T 29/49574; Y10T 409/30772
USPC ................... 84/290, 291, 293, 267
See application file for complete search history.

(56) References Cited

U.S. PATENT DOCUMENTS

| 4,027,570 A | 6/1977 | Rendell et al. |
| 4,793,236 A | 12/1988 | McGuire et al. |

(Continued)

FOREIGN PATENT DOCUMENTS

| EP | 0978820 | 2/2000 |
| EP | 2323127 | 5/2011 |

(Continued)

OTHER PUBLICATIONS

Stevens, S., "Router Cut Dovetail Neck Joints," www.luthierforum.com, Luthier Learning Center, Oct. 14, 2005.

*Primary Examiner* — Kimberly Lockett
(74) *Attorney, Agent, or Firm* — Stradley Ronon Stevens & Young, LLP

(57) ABSTRACT

A guitar neck joint routing system. The system includes a probe and router assembly comprising a gantry, a probe, and a plurality of routers, and a guitar neck and body nest comprising clamps and vacuum grips for holding a guitar neck and guitar body in place for taking measurements and routing a dovetail joint.

10 Claims, 27 Drawing Sheets

(51) Int. Cl.
*B23K 26/00* (2014.01)
*B27M 3/00* (2006.01)
*G10D 1/08* (2006.01)
*G10D 3/06* (2006.01)
*B23K 37/02* (2006.01)
*B23K 37/04* (2006.01)
*B23K 26/38* (2014.01)
*G01B 5/20* (2006.01)

(56) References Cited

U.S. PATENT DOCUMENTS

| | | |
|---|---|---|
| 4,803,906 A | 2/1989 | Fender |
| 5,125,311 A | 6/1992 | Boulanger et al. |
| 5,235,891 A | 8/1993 | Klein |
| 5,305,819 A | 4/1994 | Boulanger et al. |
| 5,511,455 A | 4/1996 | Steinberger |
| 5,679,910 A | 10/1997 | Steinberger et al. |
| 5,864,073 A | 1/1999 | Carlson |
| 5,886,272 A | 3/1999 | Regenberg |
| 5,965,830 A | 10/1999 | Carlson |
| 6,051,766 A | 4/2000 | Taylor |
| 6,076,575 A | 6/2000 | Harkness |
| 6,888,055 B2 | 5/2005 | Smith et al. |
| 7,189,907 B1 | 3/2007 | Poulin et al. |
| 7,208,664 B1 | 4/2007 | Regenberg et al. |
| 7,465,859 B2 | 12/2008 | Kroeger et al. |
| 7,476,790 B2 | 1/2009 | Breedlove et al. |
| 7,816,592 B2 | 10/2010 | Babicz |
| 7,838,750 B2 | 11/2010 | Steinberger |
| 7,893,328 B1 | 2/2011 | Rigaud et al. |
| 7,932,448 B1 | 4/2011 | Bochar, Jr. |
| 9,103,876 B2 * | 8/2015 | Nguyen .............. G01R 31/2893 |
| 2001/0029826 A1 * | 10/2001 | Teel .......................... G10D 3/06 84/293 |
| 2008/0092716 A1 | 4/2008 | Breedlove et al. |

FOREIGN PATENT DOCUMENTS

| | | |
|---|---|---|
| JP | 2000-066661 | 3/2000 |
| JP | 2006-047713 | 2/2006 |
| JP | 2011-095747 | 5/2011 |
| WO | 00/70599 | 11/2000 |
| WO | 00/74032 | 12/2000 |
| WO | 2004/097790 | 11/2004 |
| WO | 2004097790 | 11/2004 |
| WO | 2008/051435 | 5/2008 |

* cited by examiner

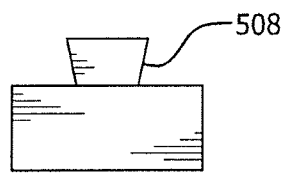
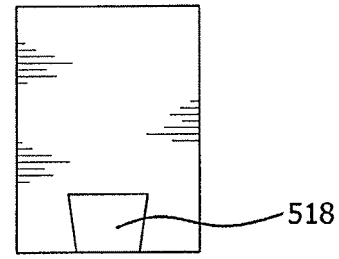
FIG. 25a    FIG. 25b
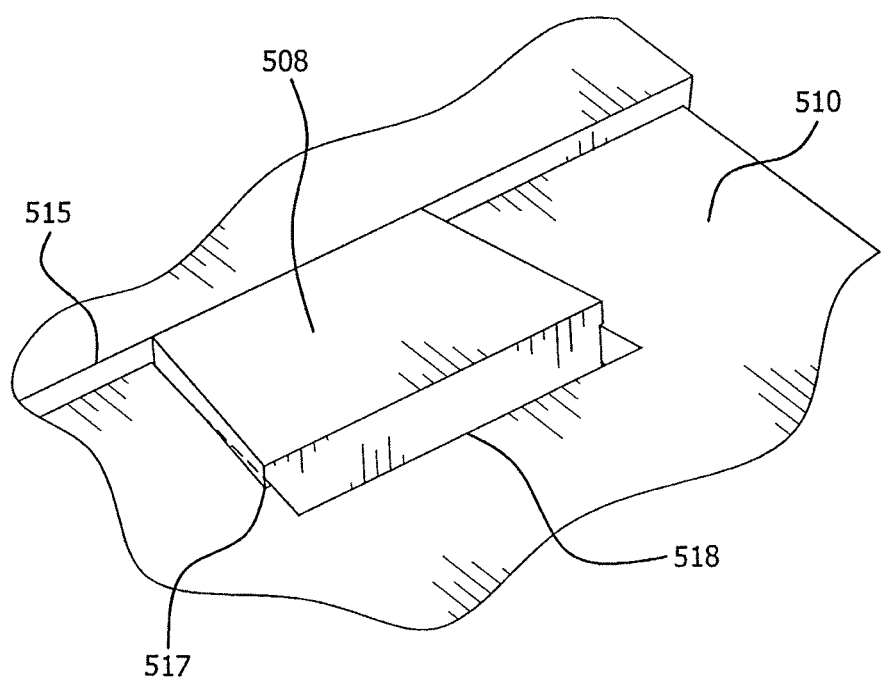
FIG. 25c

GUITAR NECK JOINT ROUTING SYSTEM

CROSS-REFERENCE TO RELATED APPLICATIONS

This application is a divisional of U.S. patent application Ser. No. 13/408,456 filed on Feb. 29, 2012, the contents of which are incorporated by reference herein, in their entirety and for all purposes.

FIELD OF THE INVENTION

The invention relates generally to the field of musical instrument manufacture. More particularly, the invention relates to automated guitar neck joint routing systems, and methods for routing dovetail joints for joining guitar bodies and guitar necks together.

BACKGROUND OF THE INVENTION

Various publications, including patents, published applications, technical articles and scholarly articles are cited throughout the specification. Each of these cited publications is incorporated by reference, in its entirety and for all purposes, in this document.

In the assembly of certain types of guitars, including acoustic guitars, the neck of the guitar is fastened to the body of the guitar by way of a wooden joint between the bottom of the neck, which is typically referred to as the heel, and the shoulder of the body of the guitar. For structural integrity of a joint between an otherwise hollow acoustic guitar body and a solid heel, the guitar body typically includes a front block (formed from wood) underneath the top surface and at the shoulder. The heel may be secured into this front block.

As one way of fastening the heel into the front block, a specialized joint may be created, for example, by cutting a mortise in either the heel or the front block, and by fashioning a matching tenon on the opposite portion. For example, the heel typically includes a tenon that is inserted into a mortise cut into the front block in the guitar body. With the mortise and tenon together, the joint may be secured with glue and with fasteners such as screws and/or bolts.

While such connections are strong, tension on the joint from tightened guitar strings may weaken the joint over time, and may cause the glue bond to fail, or in the worst case, the joint itself to fail. Even if the joint remains structurally sound, the presence of metal implements such as screws and bolts within the body may negatively affect sound quality of the instrument, and if these metal implements ever become loose, they may rattle and cause undesirable noise to emanate from the instrument when the instrument is moved, including during a performance. Therefore, there is a need to improve the connection between the neck and the body, with a goal of removing fasteners, particularly metal fasteners. In addition, there is a need to be able to prepare high-quality, tight connections between the neck and body in a high throughput manner, particularly with respect to high volume production of acoustic guitars.

SUMMARY OF THE INVENTION

The invention provides guitar neck-joint routing systems. In some aspects, a guitar neck-joint routing system comprises a probe and router assembly comprising a gantry, a probe, and a plurality of routers; a guitar neck and body nest comprising a guitar body clamp, an upper guitar neck clamp, a lower guitar neck clamp, a face probe, and nest actuator; and, a programmable logic controller comprising a human machine interface, a programmable processor, and memory.

A gantry may comprise an upper track and a lower track, a hoist track, a gantry actuator for moving the probe and router assembly laterally along the upper track and lower track, a hoist, and a hoist actuator for moving the probe and router assembly vertically along the hoist track. In some aspects, the probe may be mounted on a probe shuttle, which may be mounted on a probe track. The probe may comprise a sensor tip for measuring the geometry and surface features of a guitar neck and a guitar body, a probe processor in communication with the sensor tip and the programmable logic controller, and a probe plane actuator for moving the probe about a surface on the guitar neck and/or a surface on the guitar body. In some aspects, each router may be mounted on a router shuttle that is mounted on a router track, and each router preferably comprises a cutting tool and a router processor in communication with the programmable logic controller.

The body clamp may comprise a body platen, an upper guitar neck platen, an upper guitar neck guide pin, a lower guitar neck platen, a lower guitar neck guide pin, a plurality of vacuum grips each comprising a vacuum source, and a guitar neck joint locator comprising a plurality of neck joint locator pins. The upper guitar neck clamp may be a precision pneumatic cylinder, and may comprise an upper neck clamp slide slidably connected to an upper neck bracket. The lower guitar neck clamp may be a precision pneumatic cylinder, and may comprise a lower neck clamp slide slidably connected to a lower neck bracket.

The face probe may comprise a face probe sensor tip for measuring the geometry and surface features of the front face of the guitar body, and a face probe processor in communication with the face probe sensor tip and the programmable logic controller. The nest actuator is preferably capable of moving or pivoting the guitar neck and body nest to an angle calculated by the programmable logic controller for cutting a fingerboard pocket on the front face of the guitar body, cutting a heel pocket into the shoulder of a guitar body, and cutting a dovetail into the shoulder of a guitar body.

The programmable logic controller may comprise executable code for causing a programmable processor to cause the probe to measure the geometry and surface features of a guitar neck and a guitar body, executable code for causing a programmable processor to cause the face probe to measure the geometry and surface features of the front face of the guitar body, and executable code for causing a programmable processor to cause the plurality of routers to cut portions of the guitar body to create a dovetail joint according to the measurements of the geometry and surface features of the guitar neck and guitar body. The programmable processor may comprise a computer. The human machine interface may comprise a graphical user interface.

The invention also provides methods for routing a dovetail joint on a guitar shoulder. The methods may comprise one or more of (and in any order) determining if the bridge locus on the front face of a guitar body is flat, concave, or convex; determining if the neck angle between the heel and the finger board of a guitar neck deviates from a threshold angle; determining the thickness of the lower portion of the finger board of the guitar neck; determining whether the angle of a dovetail joint on the heel is perpendicular or non-perpendicular to the finger board of the guitar neck; determining the geometry of the finger board and the heel;

determining the top drop angle on the guitar body; and determining the horizontal position of the shoulder of the guitar body. Any one, a plurality, or all of the determining steps may be carried out using a processor programmed to carry out the determining step. The methods may comprise cutting a finger board pocket on the front face of the guitar body taking into account the geometry of the finger board; cutting a heel pocket on the shoulder of the guitar body taking into account the shape of the bridge portion, the neck angle, the top drop angle, the presence of low spots on the shoulder, the finger board thickness, and the geometry of the heel; and, cutting a dovetail joint in the shoulder of the guitar body taking into account the angle of the dovetail joint on the heel.

The methods may comprise cutting the heel pocket on the shoulder forward angle if the bridge locus is concave, or cutting the heel pocket at a backward angle if the bridge locus is convex. The methods may comprise cutting the heel pocket on the shoulder at a forward angle if the neck angle is greater than the threshold angle, or cutting the heel pocket on the shoulder at a backward angle if the neck angle is less than the threshold angle. The methods may comprise cutting the heel pocket on the shoulder at a forward angle if the finger board thickness is greater than a nominal thickness, or cutting the heel pocket on the shoulder at a backward angle if the finger board thickness is less than a nominal thickness. The methods may comprise cutting the opposite side of the dovetail angle at ½ the distance of non-perpendicularity if the angle of the dovetail joint on the heel is not perpendicular to the finger board of the guitar neck.

In some aspects, the methods comprise cutting the heel pocket on the shoulder at a backward angle if the top drop angle is less than a nominal angle, or cutting the heel pocket on the shoulder at a forward angle if the top drop angle is greater than the nominal angle. The methods may further comprise cutting the shoulder of the guitar body equal to the depth of the lowest low spot determined on the shoulder.

The invention also provides dovetail joints, including dovetail joints produced according to the methods. In some aspects, a dovetail joint comprises a female portion comprising an angle of about 8 degrees and a taper of about 0.0265 inches (0.673 mm) to about 0.0295 inches (0.749 mm) per side. In some aspects, a dovetail joint comprises a male portion comprising an angle of about 10 degrees and a taper of about 0.0265 inches (0.673 mm) to about 0.0295 inches (0.749 mm) per side.

A guitar body may comprise the dovetail joint, or a female portion thereof. A female portion of a dovetail joint in a guitar body may comprise an angle of about 8 degrees and a taper of about 0.0265 inches (0.673 mm) to about 0.0295 inches (0.749 mm) per side. A guitar may comprise a dovetail joint, or a female portion thereof. A female portion of a dovetail joint in a guitar may comprise an angle of about 8 degrees and a taper of about 0.0265 inches (0.673 mm) to about 0.0295 inches (0.749 mm) per side. The guitar body may be an acoustic guitar body. The guitar may be an acoustic guitar. The dovetail joint is preferably in wood, and preferably does not include any metal fasteners securing the male portion and female portion together.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 25a shows a perspective of a dovetail joint angle;

FIG. 25b shows a male portion of a dovetail joint and a female portion of a dovetail joint; and, FIG. 25c shows a tapered dovetail joint in which the male portion and female portion are brought together with a tight fit.

DETAILED DESCRIPTION OF THE INVENTION

Various terms relating to aspects of the invention are used throughout the specification and claims. Such terms are to be given their ordinary meaning in the art, unless otherwise indicated. Other specifically defined terms are to be construed in a manner consistent with the definition provided in this document.

As used throughout, the singular forms "a," "an," and "the" include plural referents unless expressly stated otherwise.

The invention features devices, systems, and methods for routing a dovetail neck joint for joining a guitar body and guitar neck together. The devices, systems, and methods may find use, for example, in guitar manufacture. A foundational feature is a tapered dovetail joint, and an automated process for producing the joint.

The components of the system can be fabricated from any suitable material or combination of materials. Materials include metal, plastic, polymers, glass, rubber, and composites.

Figure 1:
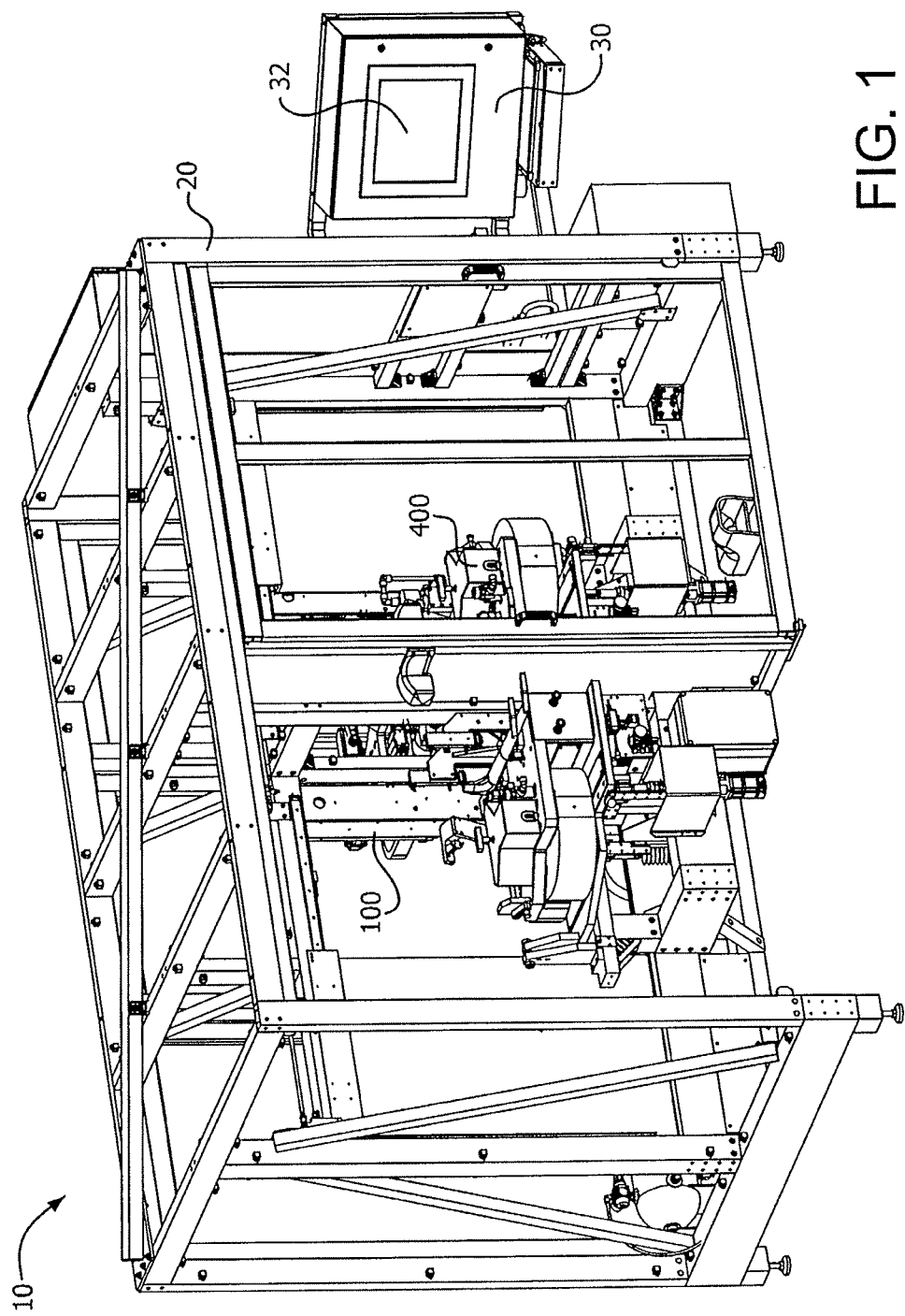
FIG. 1 shows a guitar neck joint routing system enclosed within a frame.

Referring now to the drawings, in which like reference numbers refer to like elements throughout the various figures that comprise the drawings, FIG. 1 shows one non-limiting embodiment of a guitar neck joint routing system 10, including a frame 20, a programmable logic controller (PLC) 30 with a graphical user interface 32, a probe and router assembly 100, and a guitar neck and body nest 400. The PLC 30 is enclosed within an enclosure, and may comprise software for controlling the system, movement of its various components, calculations involving mathematical equations, and manipulation of the graphical user interface 32.

Figure 2:
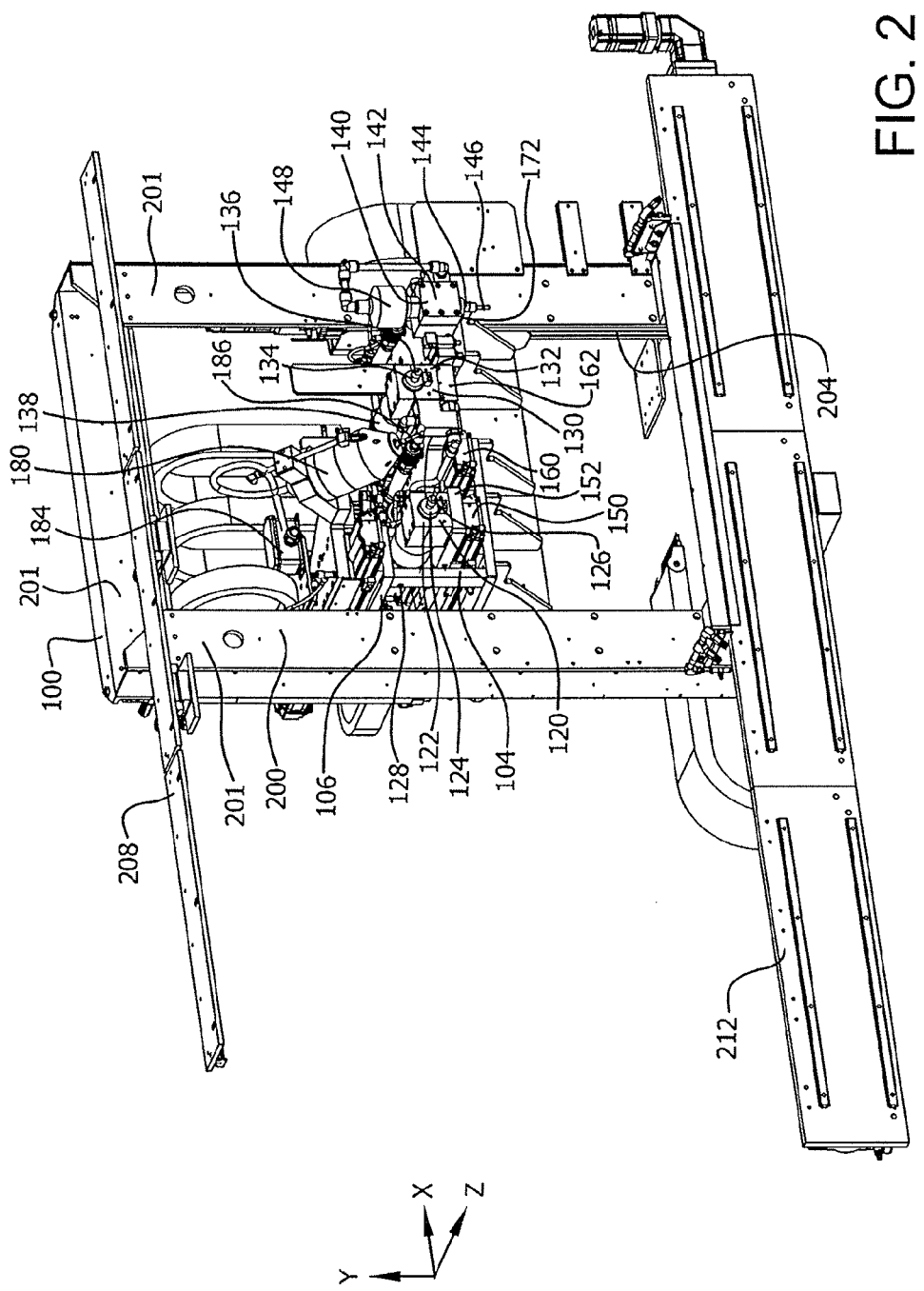
FIG. 2 shows a front perspective of a probe and router assembly.

The probe and router assembly 100 includes components that measure portions of a guitar neck 502 and a guitar body 510, and cut a dovetail joint 508, 518 between them to ensure a proper fit of neck 502 and the body 510 during assembly of a guitar. In some preferred embodiments, the probe and router assembly 100 components cut a female portion 518 of a dovetail joint 508, 518. FIG. 2 shows one embodiment of the probe and router assembly 100 from a front perspective. As shown in FIG. 2, the assembly 100 includes basic structural features, including a gantry 200, an upper gantry track 208, a lower gantry track 212, a router platen 104, and a probe platen 106.

The router platen 104 supports a plurality of routers. As shown in FIG. 2, the assembly 100 may comprise three routers, including a first router 120, a second router 130, and a third router 140. Each router 120, 130, and 140 cuts one or more portions of the guitar body 510 to generate a female portion 518 of the dovetail joint 508, 518 for joining the guitar neck 502 and guitar body 510 together when assembling a guitar.

Each of the first 120, second 130, and third 140 routers comprise substantially the same components. For example, the first router 120 includes a first motor housing 122 that encloses a first motor (not shown), a first chuck 124 that holds a first cutting tool 126, a first processor 128, and a first input (not shown) operably connected to the first processor 128. The second router 130 includes a second motor housing 132 that encloses a second motor (not shown), a second chuck 134 that holds a second cutting tool 136, a second processor 138, and a second input (not shown) operably connected to the second processor 138. The third router 140 includes a third motor housing 142 that encloses a third motor (not shown), a third chuck 144 that holds a third cutting tool 146, a third processor 148, and a third input (not shown) operably connected to the third processor 148. The first motor, the second motor, and the third motor may each independently comprise an air-driven motor.

The first 126, second 136, and third 146 cutting tools may comprise a router bit 126, 136, and 146 of any suitable shape or size. For example, a router bit 126, 136, and 146 may comprise a rabbet bit, a dovetail bit, a surface bit, a straight bit, a mortise bit, a chamfer bit, an abrasive bit, or other suitable router bit, the shapes of which are well-known in the art. The first 126, second 136, and third 146 cutting tools may comprise a blade, or may comprise a laser cutter.

The first 128, second 138, and third 148 processors may receive a signal through the first, second, and third inputs, respectively. The signal may originate, for example, from the PLC 30. The signal causes the first 128, second 138, and third 148 processors to cause activation of the first 120, second 130, and third 140 routers, respectively, and to cause each of the first 120, second 130, and third 140 routers to cut a guitar neck 502 and a guitar body 510 according to specifications determined by the PLC 30 of the system 10. Cutting of the guitar body 510 is preferably automated. If the system 10 makes any cuts on the guitar neck 502, such cuts are also preferably automated.

The first router 120 is preferably mounted on a first shuttle 152, which is preferably mounted on a first router track 150. In an alternative embodiment, the first router 120 is mounted directly on the first router track 150. Whether mounted on the first shuttle 152 or the first track 150, the first router 120 may move laterally along a z-plane For example, the first shuttle 152, or the first router 120 itself, may move along the first router track 150, which is positioned in a z-plane relative to an x-plane and a y-plane established by the geometry of the gantry 200. Movement of the first shuttle 152 or the first router 120 along the first track 150 is controlled by a first router actuator (not shown). The first router actuator causes the first shuttle 152 or the first router 120 to move back and forth along the first router track 150. The first router actuator may comprise a linear actuator, and may comprise a cylinder-piston assembly, a hydraulic actuator, a cam actuator, a pneumatic actuator, a wheel and axel, a winch, a rack and pinion, or a screw.

The mounting of the first router 120 to the first shuttle 152 or to the first router track 150, may comprise a first hinge (not shown). Thus, the first router 120 may also flip from its position in a horizontal plane to a position in a vertical plane such that the first cutting tool 126 may point downward, and reverse back to the horizontal plane. For example, FIG. 2 shows the first router 120 positioned in a horizontal plane, substantially parallel with the z-plane of the first router track 150. FIG. 2 shows the third router 140 positioned in a vertical plane, substantially perpendicular with the z-plane of both the first router track 150 and a third router track 170. FIG. 2 thus illustrates two possible positions that each router 120, 130, and 140 may assume—a position in a horizontal plane, or a position in a vertical plane. The latter position is preferably the position the router 120, 130, or 140 assumes when it is engaged to cut the guitar neck 502 and/or guitar body 510. The first hinge allows the first router 120 to move between the horizontal position and the vertical position as shown. A first hinge actuator (not shown) moves the first router 120 between the horizontal and vertical positions via the first hinge. The first hinge actuator may comprise a linear actuator, and may comprise a cylinder-piston assembly, a hydraulic actuator, a cam actuator, a pneumatic actuator, a wheel and axel, a winch, a rack and pinion, or a screw.

The second router 130 is preferably mounted on a second shuttle 162, which is preferably mounted on a second router track 160. In an alternative embodiment, the second router 130 is mounted directly on the second router track 160. Whether mounted on the second shuttle 162 or the second track 160, the second router 130 may move laterally along a z-plane. For example, the second shuttle 162, or the second router 130 itself, may move along the second router track 160, which is positioned in a z-plane relative to the x-plane and y-plane established by the geometry of the gantry 200. Movement of the second shuttle 162 or the second router 130 along the second track 160 is controlled by a second router actuator (not shown). The second router actuator causes the second shuttle 162 or the second router 130 to move back and forth along the second router track 160. The second router actuator may comprise a linear actuator, and may comprise a cylinder-piston assembly, a hydraulic actuator, a cam actuator, a pneumatic actuator, a wheel and axel, a winch, a rack and pinion, or a screw.

The mounting of the second router 130 to the second shuttle 162 or to the second router track 160 may comprise a second hinge (not shown). Thus, the second router 130 may also flip from its position in a horizontal plane to a position in a vertical plane such that the second cutting tool 136 may point downward, and vice versa. For example, FIG. 2 shows the second router 130 positioned in a horizontal plane, substantially parallel with the z-plane of the second router track 160. FIG. 2 shows the third router 140 positioned in a vertical plane, substantially perpendicular with the z-plane of both the second router track 160 and the third router track 170. The second hinge allows the second router 130 to move between the horizontal position and the vertical position as shown in FIG. 2. A second hinge actuator (not shown) moves the second router 130 between the horizontal and vertical positions via the second hinge. The second hinge actuator may comprise a linear actuator, and may comprise a cylinder-piston assembly, a hydraulic actuator, a cam actuator, a pneumatic actuator, a wheel and axel, a winch, a rack and pinion, or a screw.

The third router 140 is preferably mounted on a third shuttle 172, which is preferably mounted on a third router track 170. In an alternative embodiment, the third router 140 is mounted directly on the third router track 170. Whether mounted on the third shuttle 172 or the third track 170, the third router 140 may move laterally along a z-plane. For example, the third shuttle 172, or the third router 140 itself, may move along the third router track 170, which is positioned in a z-plane relative to the x-plane and y-plane established by the geometry of the gantry 200. Movement of the third shuttle 172 or the third router 140 along the third track 170 is controlled by a third router actuator 174. The third router actuator 174 causes the third shuttle 172 or the third router 140 to move back and forth along the third router track 170. The third router actuator 174 may comprise a linear actuator, and may comprise a cylinder-piston assembly, a hydraulic actuator, a cam actuator, a pneumatic actuator, a wheel and axel, a winch, a rack and pinion, or a screw.

Figure 3:
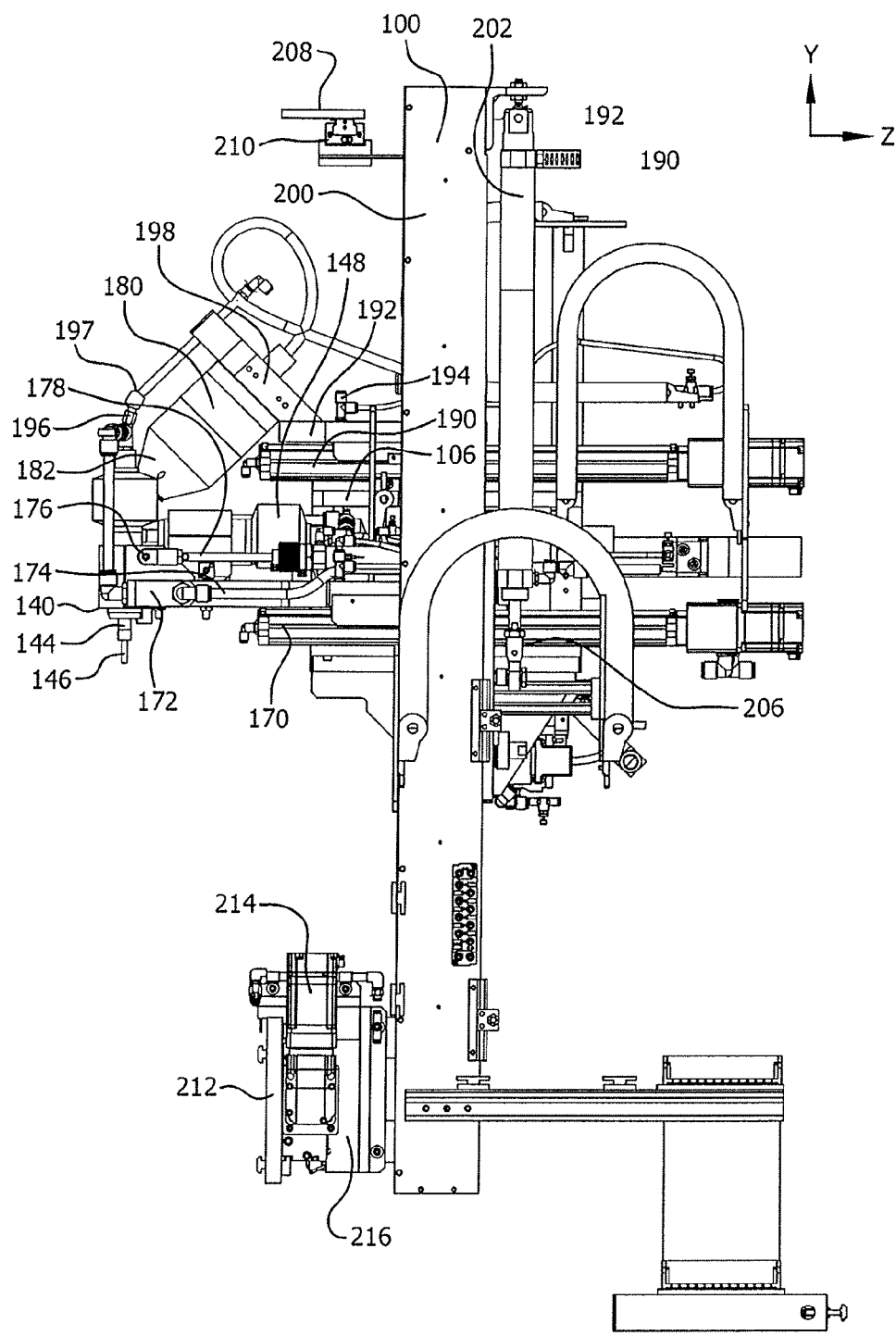
FIG. 3 shows a side perspective of the probe and router assembly.

The mounting of the third router 140 to the third shuttle 172 or the third router track 170 may comprise a third hinge 176. Thus, the third router 140 may also flip from its position in a horizontal plane to a position in a vertical plane such that the third cutting tool 146 may point downward, and vice versa. For example, FIG. 2 shows the third router 140 positioned in a vertical plane, substantially perpendicular with the z-plane of the third router track 170. The third hinge 176 allows the third router 140 to move between the horizontal position and the vertical position as shown in FIG. 2. A third hinge actuator 178 moves the third router 140 between the horizontal and vertical positions via the third hinge 176. The third hinge actuator 178 may comprise a linear actuator, and may comprise a cylinder-piston assembly, a hydraulic actuator, a cam actuator, a pneumatic actuator, a wheel and axel, a winch, a rack and pinion, or a screw. FIG. 3 shows the third router 140 in the vertical position, and shows the third hinge 176 and third hinge actuator 178 on the third router 140.

The probe platen 106 supports at least one probe 180. As shown in FIG. 2 and FIG. 3, the assembly 100 may comprise a single probe 180. The probe 180 measures portions of the guitar neck 502 and guitar body 510 and communicates its measurements to the PLC 30 to allow the PLC 30 to determine the dimensions for cutting at least the female portion 518 of the dovetail joint 508, 518 for joining the neck 502 and body 510 together when assembling a guitar.

The probe 180 comprises a probe processor housing 182, which contains a probe processor 184 to which is operably connected a probe processor input (not show) and a probe processor output (not shown), and comprises a sensor tip 186. The sensor tip 186 takes measurements, including length, width, height, angles, distortions, and other geometric and surface features of the guitar neck 502, the guitar heel 504 portion of the neck 502, the guitar finger board 506 portion of the neck 502, the male dovetail joint 508 portion of the neck 502, the guitar body 510, the front face 512 of the guitar body 510, and/or the shoulder 514 of the guitar body 510, and the female dovetail joint 518 portion of the guitar body 510. The sensor tip 186 is operably connected to the probe processor input and sends a signal concerning information about the measurements to the probe processor 184 via the input, and the probe processor 184 relays the signal to the PLC 30 via the probe processor output. The sensor tip 186 may comprise one or more lasers, wheels, balls, or other suitable sensors, including sensors that take measurements based on machine vision.

The probe 180 is preferably mounted on a probe shuttle 192, which is preferably mounted on a probe track 190. In an alternative embodiment, the probe 180 is mounted directly on the probe track 190. Whether mounted on a probe shuttle 192 or a probe track 190, the probe 180 may move laterally along a z-plane. For example, the probe shuttle 192, or the probe 180 itself, may move along the probe track 190, which is positioned in a z-plane relative to the x-plane and y-plane established by the geometry of the gantry 200. Movement of the probe shuttle 192 or the probe 180 along the probe track 190 is controlled by a probe actuator 194. The probe actuator 194 causes the probe shuttle 192 or the probe 180 to move back and forth along the probe track 190. The probe actuator 194 may comprise a linear actuator, and may comprise a cylinder-piston assembly, a hydraulic actuator, a cam actuator, a pneumatic actuator, a wheel and axel, a winch, a rack and pinion, or a screw.

The mounting of the probe 180 to the probe shuttle 192 may comprise a probe hinge 196, and/or a pivot 197. Thus, the probe 180 may move upward and downward in a vertical plane, and may also move laterally in a horizontal plane. Such movement of the probe 180, coupled with the forward and backward movement along a z-plane, moves the sensor tip 186 along the surfaces of the wood of the guitar neck 502 and the guitar body 510 to take the necessary measurements. The probe hinge 196 and/or the pivot 197 allow the probe 180 to move vertically and laterally, and all other possible directions. A probe plane actuator 198 moves the probe 180 vertically and laterally via the probe hinge 196 and/or pivot 197. The probe plane actuator 198 may comprise a linear actuator, and may comprise a cylinder-piston assembly, a hydraulic actuator, a cam actuator, a pneumatic actuator, a wheel and axel, a winch, a rack and pinion, or a screw.

Figure 4:
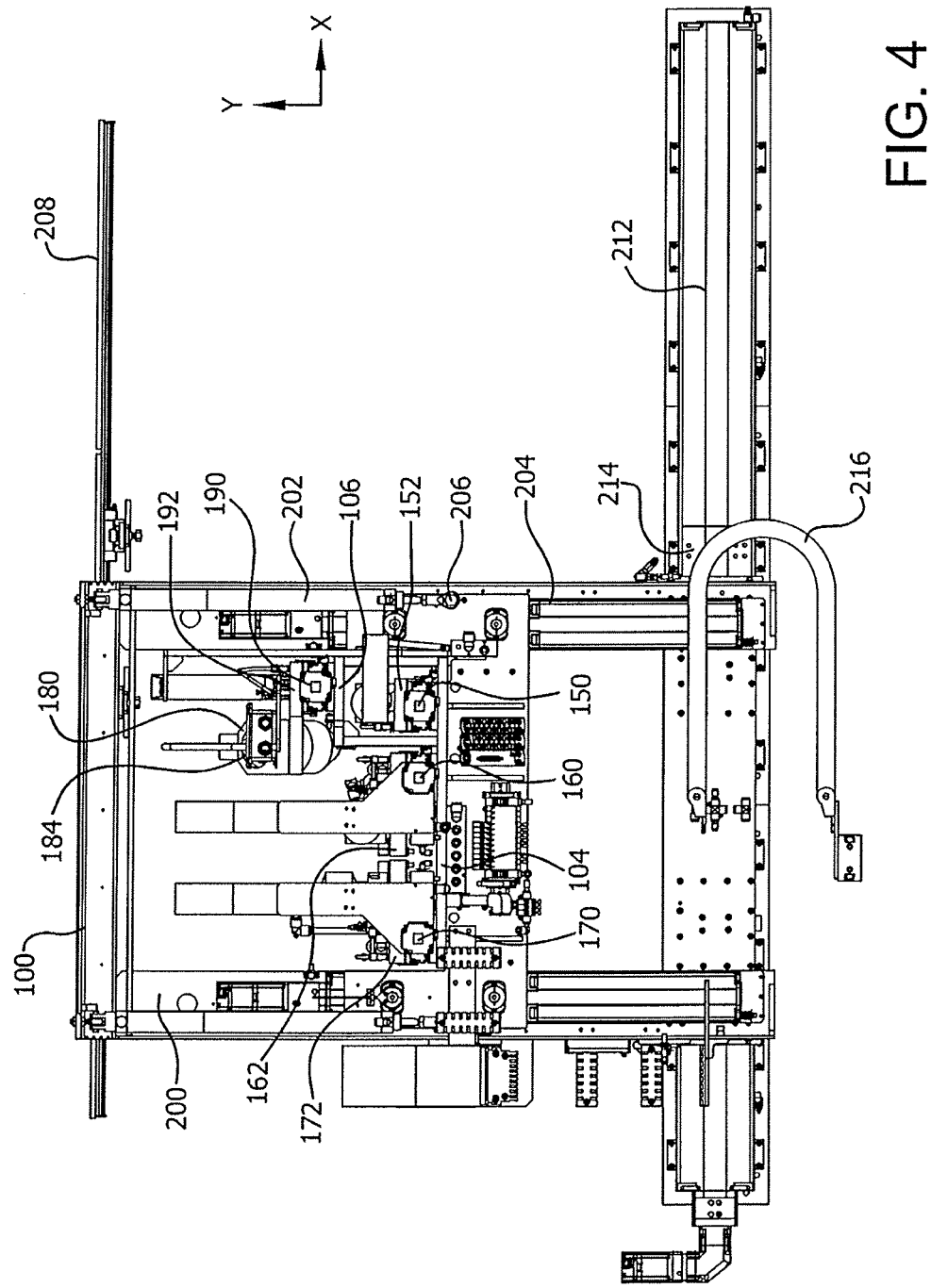
FIG. 4 shows a rear perspective of the probe and router assembly.

The gantry 200 provides a basic structural framework to which the router platen 104 and the probe platen 106 may be mounted and moved. As shown in FIGS. 2-4, the gantry 200 includes an upper dolly 210 that engages the upper gantry track 208 and a lower dolly 214 that engages the lower gantry track 212. The upper dolly 210 and the lower dolly 214 allow the gantry 200 to move laterally along the upper gantry track 208 and the lower gantry track 212 in an x-plane (FIG. 4). Such movement along the upper track 208 and lower track 212 may be effectuated for example, by a gantry actuator 216. The gantry actuator 216 may comprise a linear actuator, and may comprise a cylinder-piston assembly, a hydraulic actuator, a cam actuator, a pneumatic actuator, a wheel and axel, a winch, a rack and pinion, or a screw. Lateral movement about the x-plane may allow the probe and router assembly 100 to measure and cut a set of a guitar neck 502 and a guitar body 510 on one half of the nest 400a, while an operator loads a new set of a guitar neck 502 and guitar body 510 into the other half of the nest 400b (See FIG. 13 and FIG. 14).

The gantry 200 comprises a gantry frame 201, and comprises a hoist 202 to which the probe and router assembly 100 is operably connected. The hoist 202 moves the probe and router assembly 100 vertically in a y-plane (along the vertical axis), via a hoist track 204. Movement of the hoist 202 along the hoist track 204 may be effectuated, for example, by a hoist actuator 206. The hoist actuator 206 may comprise a linear actuator, and may comprise a cylinder-piston assembly, a hydraulic actuator, a cam actuator, a pneumatic actuator, a wheel and axel, a winch, a rack and pinion, or a screw. Different types of guitar necks 502 and guitar bodies 510, including their different shapes, configuration, and height, may necessitate that the height of the probe and router assembly 100 be adjusted relative to the wooden components to be measured and cut, and this height adjustment of the probe and router assembly 100 may be achieved via vertical movement along the hoist track 204.

Figure 5:
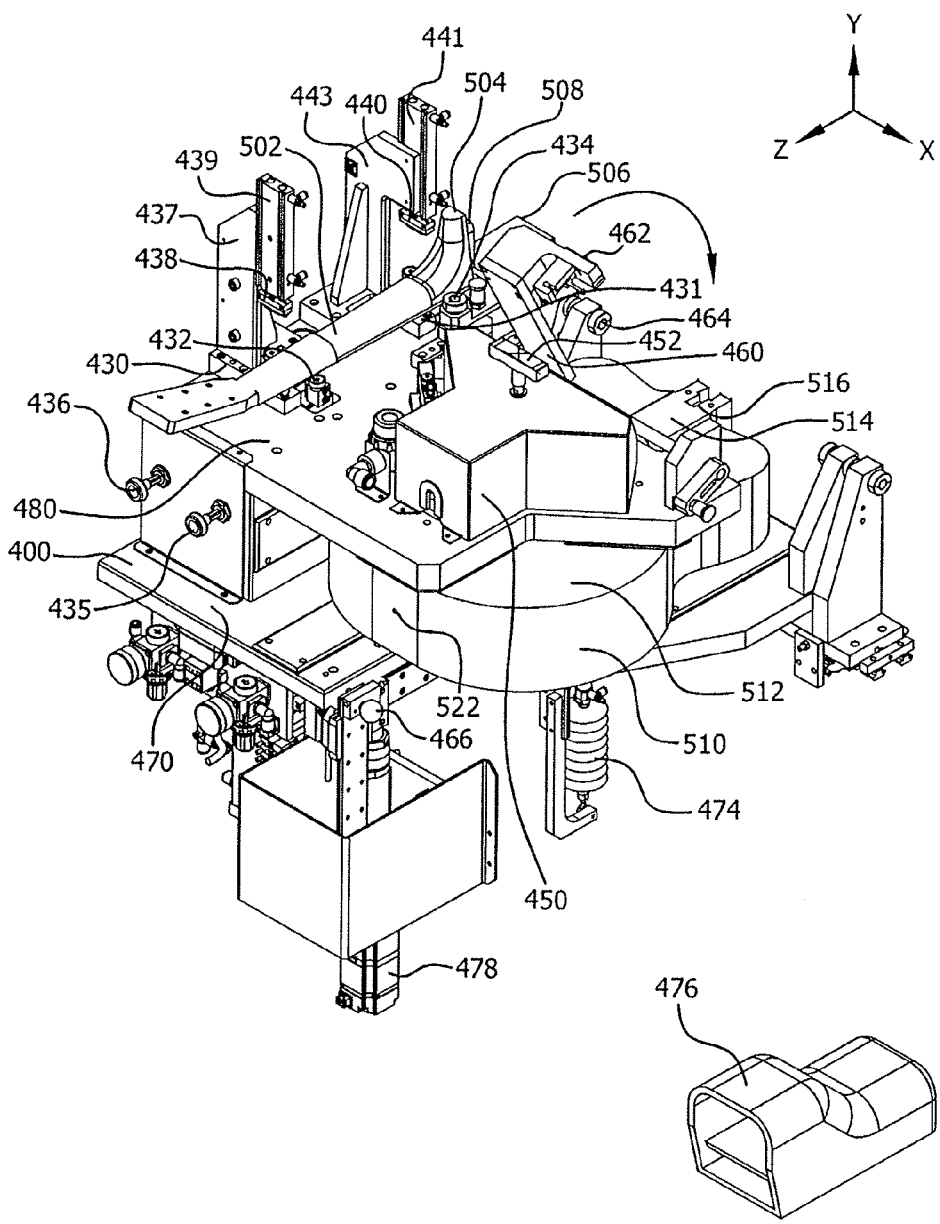
FIG. 5 shows a rear perspective of a guitar neck and body nest.

To hold a guitar body 510 and a guitar neck 502 in place for routing the dovetail joint 508, 518, the system 10 includes a guitar neck and body nest 400. Various perspectives of the nest 400 are shown on FIGS. 5-11. As shown in FIG. 5, the guitar neck and body nest 400 comprises a body clamp 480, on which additional components are present. These components include an upper neck platen 430 and a lower neck platen 431 onto which a guitar neck 502 to be measured and routed may be placed. To assist proper positioning of the guitar neck 502 on the upper 430 and lower 431 neck platens, the body clamp 480 includes an upper neck guide pin 432 and a lower neck guide pin 434, which may be moved or adjusted to ensure the guitar neck 502 is in the proper orientation before measurements of the guitar heel 504 portion of the neck 502, the guitar finger board 506 portion of the neck 502, and the male dovetail joint 508 are taken. The upper neck guide pin 432 and the lower neck guide pin 434 may comprise a pneumatic gripper, including a precision pneumatic parallel gripper assembly.

To further assist proper positioning of the guitar neck 502, the body clamp 480 includes an upper neck clamp 438 and a lower neck clamp 440. Each of the upper 438 and lower 440 neck clamps may be adjusted along the y-plane to help hold the guitar neck 502 firmly in place during measurement and cutting.

The upper neck clamp 438 may be mounted on an upper neck clamp slide 439, which may be manually adjusted, for example, by a user pushing or pulling the upper neck slide 439 about the y-plane, and optionally locking the upper neck clamp 438 in place when the desired position is achieved. In some alternative aspects, the movement of the upper neck clamp 438 about the slide 439 may be effectuated by actuation of an upper pneumatic valve 445. Movement of the upper pneumatic valve 445 may be effectuated by an upper pneumatic valve actuator 444, which may engage and disengage the upper neck clamp 438 which travels about the upper neck slide 439. Movement of the upper neck clamp 438 may stop when the clamp 438 contacts the surface of the guitar neck 502. The upper neck clamp slide 439 is slidably connected to an upper neck bracket 437, which is affixed to the body clamp 480. The upper neck clamp 438 may be a precision pneumatic cylinder, and air pressure may control the clamping force.

The lower neck clamp 440 may be mounted on a lower neck damp slide 441, which may be manually adjusted, for example, by a user pushing or pulling the lower neck slide 441 about the y-plane, and optionally locking the lower neck clamp 440 in place when the desired position is achieved. In some alternative aspects, the movement of the lower neck clamp 440 about the slide 441 may be effectuated by actuation of a lower pneumatic valve 447. Movement of the lower pneumatic valve 447 may be effectuated by a lower pneumatic valve actuator 446, which may engage and disengage the lower neck clamp 440 which travels about the lower neck slide 441. Movement of the lower neck clamp 440 may stop when the clamp 440 contacts the surface of the guitar neck 502. The lower neck slide 441 is slidably connected to a lower neck bracket 443, which is affixed to the body clamp 480. The lower neck clamp 440 may be a precision pneumatic cylinder, and air pressure may control the clamping force.

Figure 6:
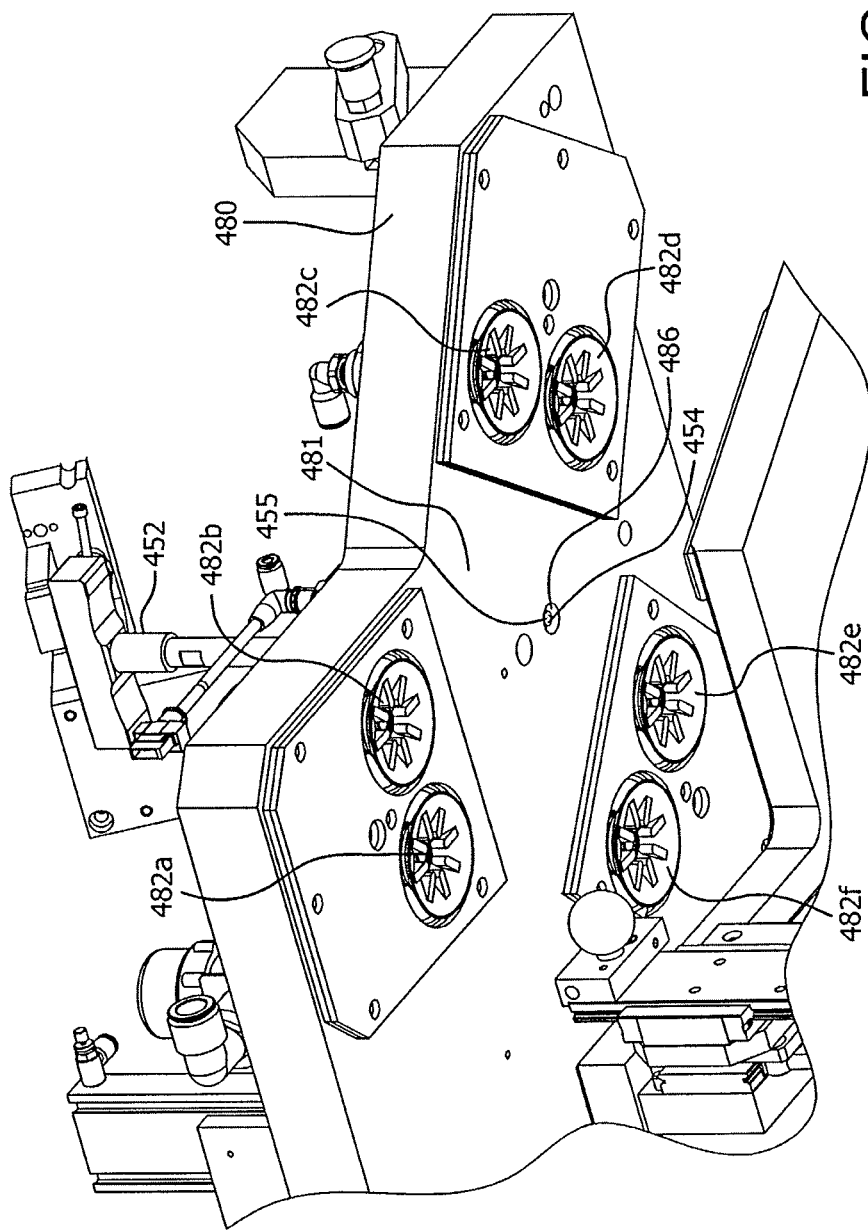
FIG. 6 shows a bottom perspective of a guitar body clamp.
Figure 7:
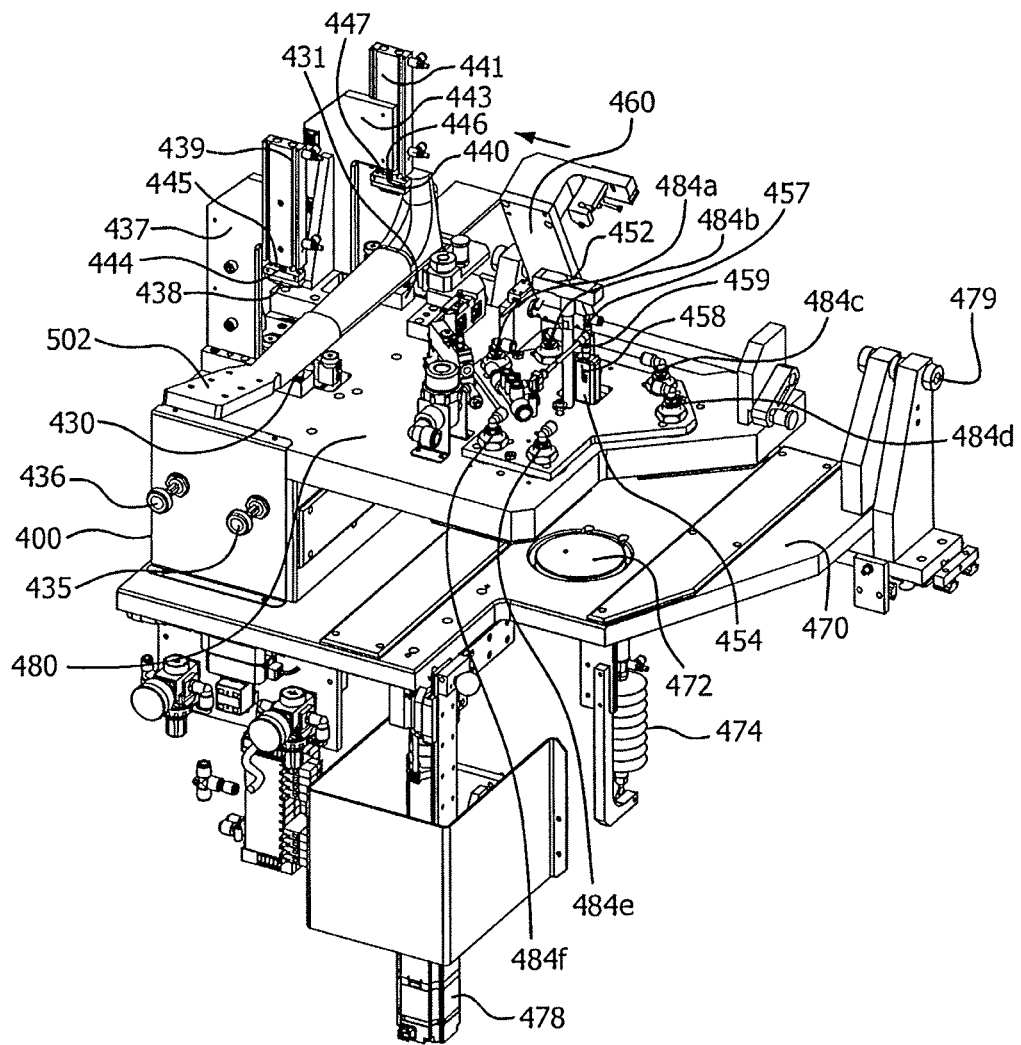
FIG. 7 shows a rear perspective of a guitar neck and body nest with the face probe cover removed.

A guitar body 510 may be held in place within the neck and body nest 400 between the body clamp 480 and a body platen 470. On the lower surface 481 of the body clamp 480, are a plurality of vacuum grips 482a-f. FIG. 6 shows a non-limiting embodiment of the lower surface 481, and shows six vacuum grips 482a-f. A vacuum is provided through a vacuum source 484 as shown in FIG. 7, which illustrates six vacuum sources 484a-f. The vacuum flows through the vacuum grips 482a-f, and secures the guitar body 510 in place during measurement and cutting of the body 510.

Vacuum sources 484a-f are on the body clamp 480, and are housed within a face probe housing 450, as shown in FIG. 5. The vacuum may be controlled by the user, for example, by adjusting a T-handle 452 during operation of the system 10. Alternatively, the vacuum may be controlled by the PLC 30.

As shown in FIG. 7, the face probe housing 450 houses a face probe 454. The face probe 454 measures the front face 512 of the guitar body 510, about the area where a bridge will be mounted, to determine the bridge height that will be required for mounting the bridge onto the front face 512 of the body 510 during the latter stages of the assembly of a guitar. The bridge height and proper angle of the mounting of the guitar neck 502 onto the body 510 preferably are taken into account to ensure proper positioning of guitar strings.

The face probe 454 comprises a face probe sensor tip 455 and a face probe processor 458 to which is operably connected a face probe input 457 and a face probe output 459. The face probe sensor tip 455 takes measurements, including length, width, height, angles, distortions, and other geometric and surface features of the front face 512 of the guitar body 510. The sensor tip 455 is operably connected to the face probe input 457 and sends a signal concerning information about the measurements to the face probe processor 458 via the input 457, and the face probe processor 458 relays the signal to the PLC 30 via the face probe output 459.

The face probe 454 may access the front surface 512 via a face probe bore 486 that passes through the body clamp 480 (FIG. 6). The face probe 454 may extend through the bore 486, and pass through the bottom surface 481, and onto the front face 512. Movement of the face probe 454 may be effectuated, for example, with a face probe actuator (not shown). The movement may be about a y-plane.

To assist in the proper positioning of the guitar body 510 within the nest 400, the body clamp 480 includes a neck joint locator 460 (FIG. 5 and FIG. 7). The neck joint locator 460 includes a plurality of neck joint locator pins 462. FIG. 5 shows a non-limiting embodiment with one neck joint locator pin 462. The neck joint locator pin 462 matches up with, and can be inserted into neck joint locator pin hole 516 located near the top of the front face 512 of the guitar body 510 (FIG. 5). The neck joint locator 460 may be mounted on a joint locator hinge 464, which permits the neck joint locator 460 to be raised and lowered in place, for example, between an open position and closed position. When lowered into place, in the closed position, the neck joint locator pin 462 is inserted into the neck joint locator pin hole 516. In some aspects, the body clamp 480 includes a bottom locator pin 466 for engaging a bottom pin hole 522 on the bottom of the guitar body 510.

During initial manufacture of the guitar body 510, the top is angled slightly inward, toward the bottom surface 520 of the body 510. This angle, referred to as a top drop angle, is taken into account and measured by the probe 180. During routing of the guitar body 510 to prepare the female dovetail joint 518, the guitar body 510 may need to be positioned within the nest 400 to compensate for the top drop angle and ensure proper geometry when the guitar neck 502 and body 510 are assembled into a guitar. To adjust the angle of the guitar body 510 being held in place between the body platen 470 and body clamp 480, the nest 400 includes a bottom clamp 472 (FIG. 7).

Figure 8:
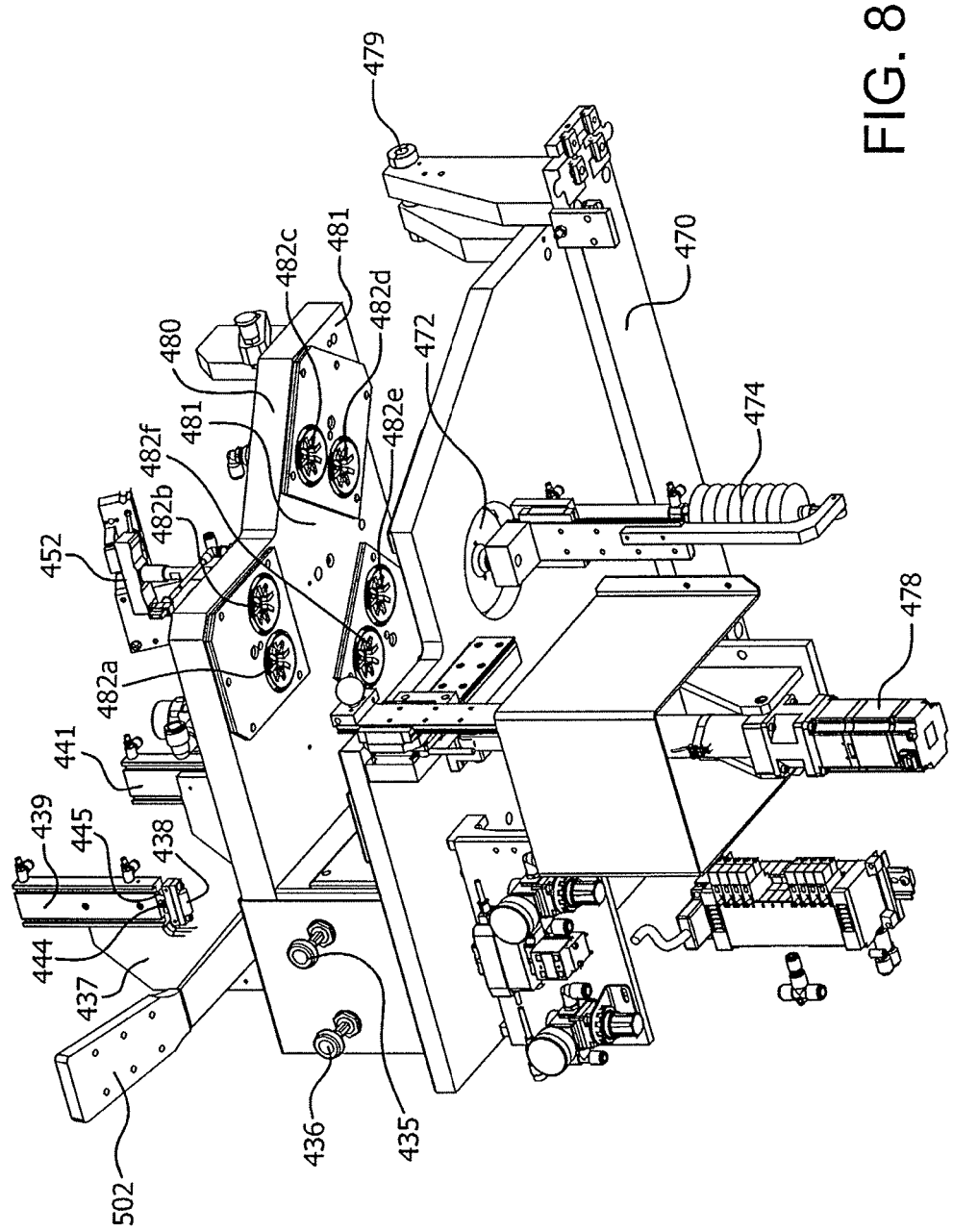
FIG. 8 shows a bottom perspective of a guitar neck and body nest.

The bottom clamp 472 contacts the bottom surface 520 of the guitar body 510, and may push the body 510 upward in the direction of the bottom surface 481 of the body clamp 480, for example, to help secure the guitar body 510 firmly in place. Movement of the bottom clamp 472 may be effectuated, for example, by a bottom clamp actuator 474. The bottom clamp actuator 474 may comprise a linear actuator, and may comprise a cylinder-piston assembly, a hydraulic actuator, a cam actuator, a pneumatic actuator, a wheel and axel, a winch, a rack and pinion, or a screw. FIG. 8 shows a bottom perspective of the nest 400, and shows an embodiment of the bottom clamp 472 operably connected to the bottom clamp actuator 474. The bottom clamp actuator 474 may be controlled manually, for example, by a user pressing a foot pedal 476. Alternatively, the bottom clamp actuator 474 may be controlled by the PLC 30.

The nest 400 preferably also comprises a nest actuator 478, which moves and/or pivots the nest 400 in various angles about the x-axis. Thus, for example, the nest actuator 478 may move the nest 400 and with it, the guitar body 510 secured within the nest 400. Movement of the nest 400 in this manner allows tilting of the guitar body 510 at a desired angle, for example, during measurement or cutting of the guitar body 510. Movement of the nest actuator 478 is preferably controlled by the PLC 30. In some aspects, movement may be assisted by a nest hinge 479 (FIG. 7).

Figure 9:
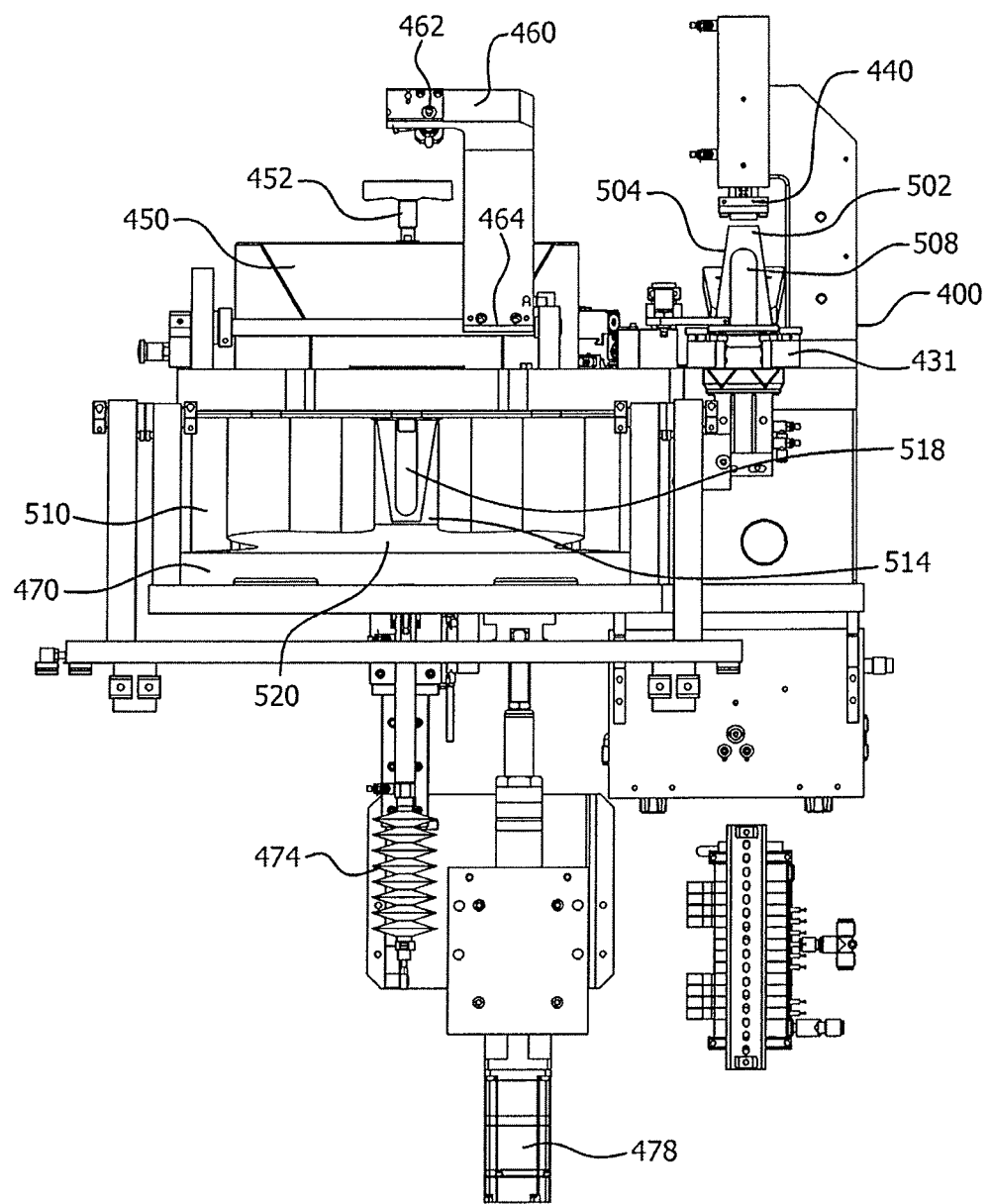
FIG. 9 shows a front perspective of a guitar neck and body nest.
Figure 10:
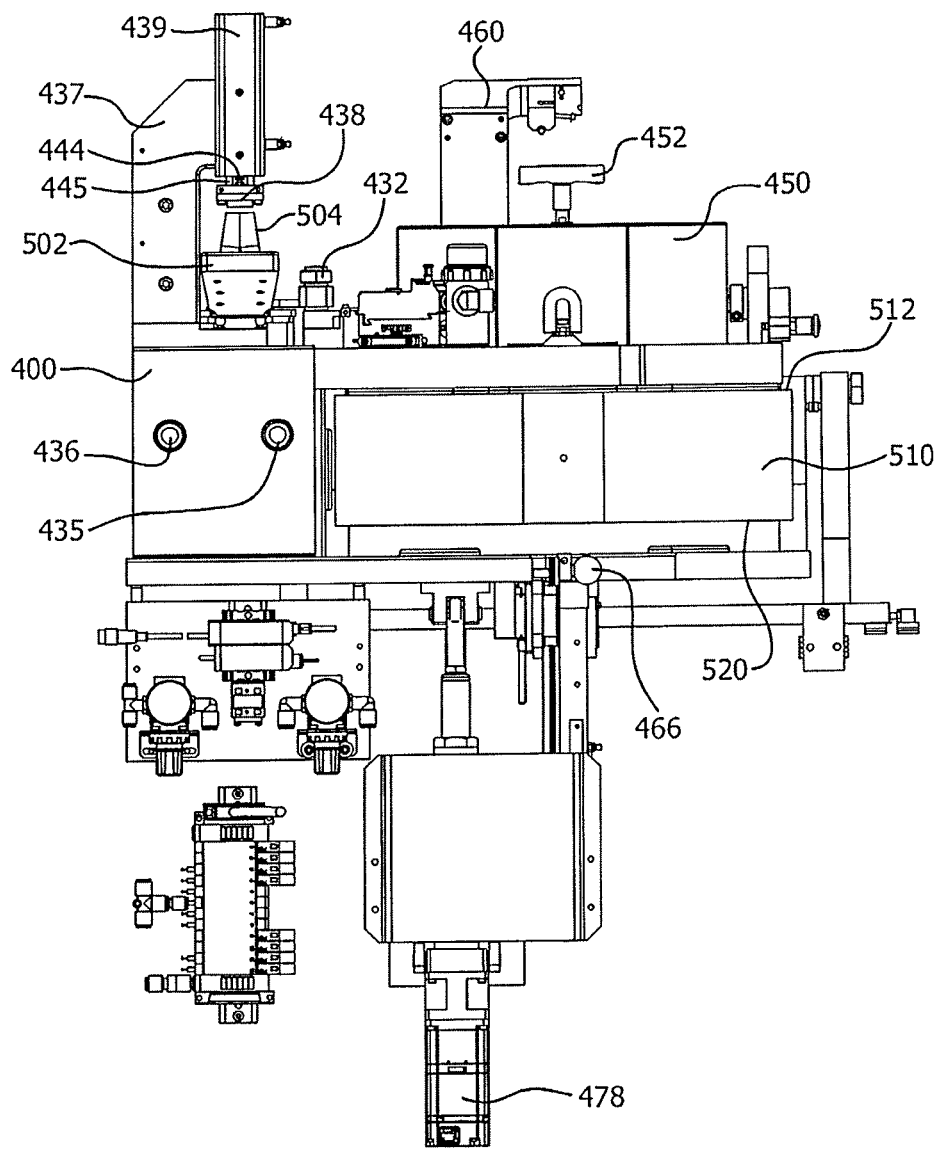
FIG. 10 shows a rear perspective of a guitar neck and body nest.
Figure 11:
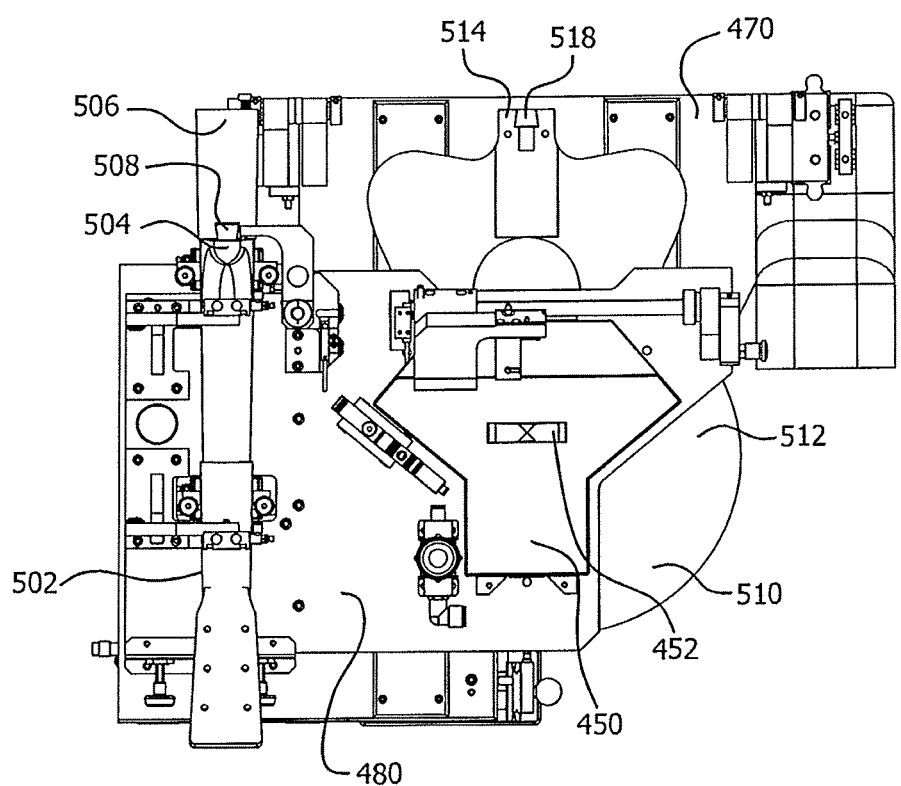
FIG. 11 shows a top perspective of a guitar neck and body nest.

FIGS. 9, 10, and 11 show additional perspectives of the neck and body nest 400. FIG. 9 shows a front perspective of the nest 400, and illustrates the guitar body 510 secured between the body platen 470 and the body clamp 480. The female portion 518 of the dovetail joint 508, 518 on the shoulder 514 of the guitar body 510 is shown. The male portion 508 of the dovetail joint 508, 518 on the bottom of the guitar neck 502 and neck heel 504 is shown. FIG. 10 shows a rear perspective of the nest 400, and illustrates the guitar body 510 secured between the body platen 470 and the body clamp 480.

FIG. 11 shows a top perspective of the neck and body nest 400, and shows the positioning of the guitar body 510 and the guitar neck 502 within the body clamp 480 and upper 438 and lower 440 neck clamps. The lower portion of the guitar fingerboard 506 is shown, and the male portion 508 of the dovetail joint 508, 518 is shown on the neck heel 504 of the neck 502, and the female portion 518 of the dovetail joint 508, 518 is shown on the guitar body 510.

Figure 12:
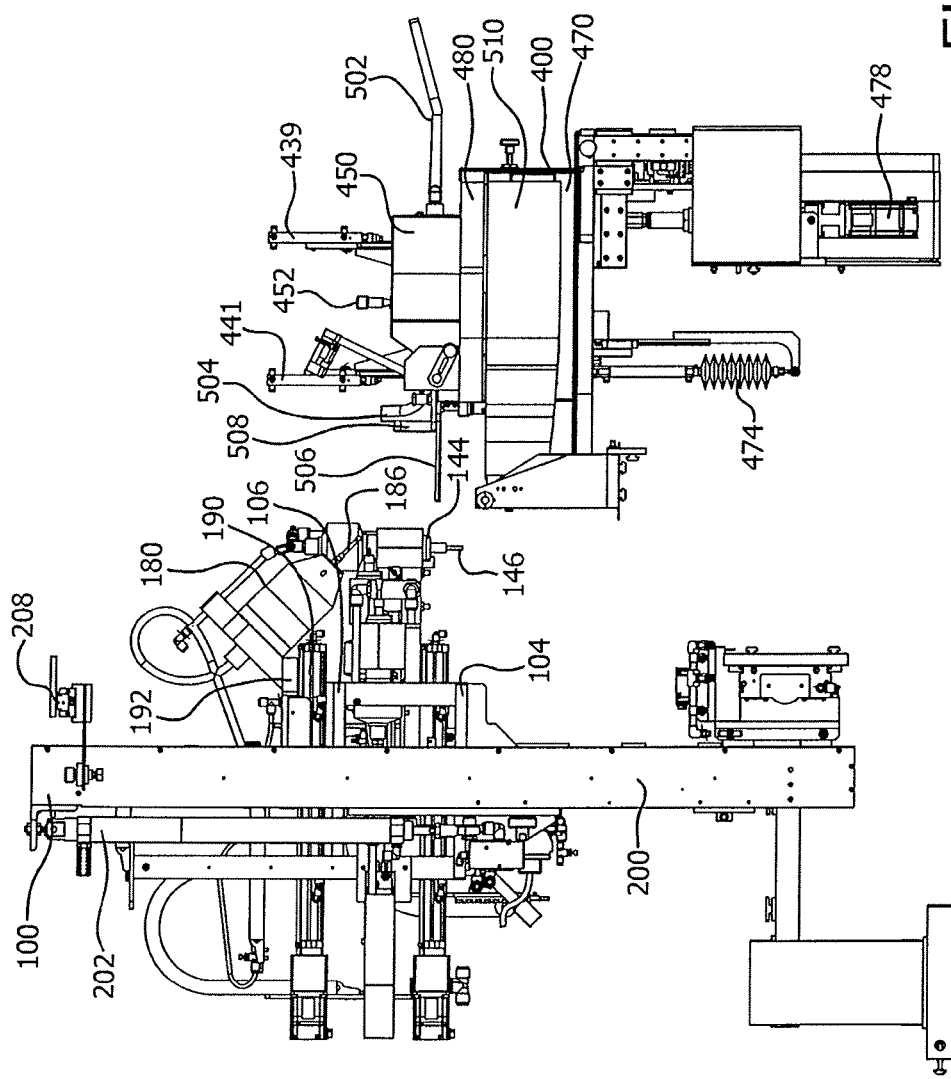
FIG. 12 shows a side perspective of a guitar neck joint routing system.
Figure 13:
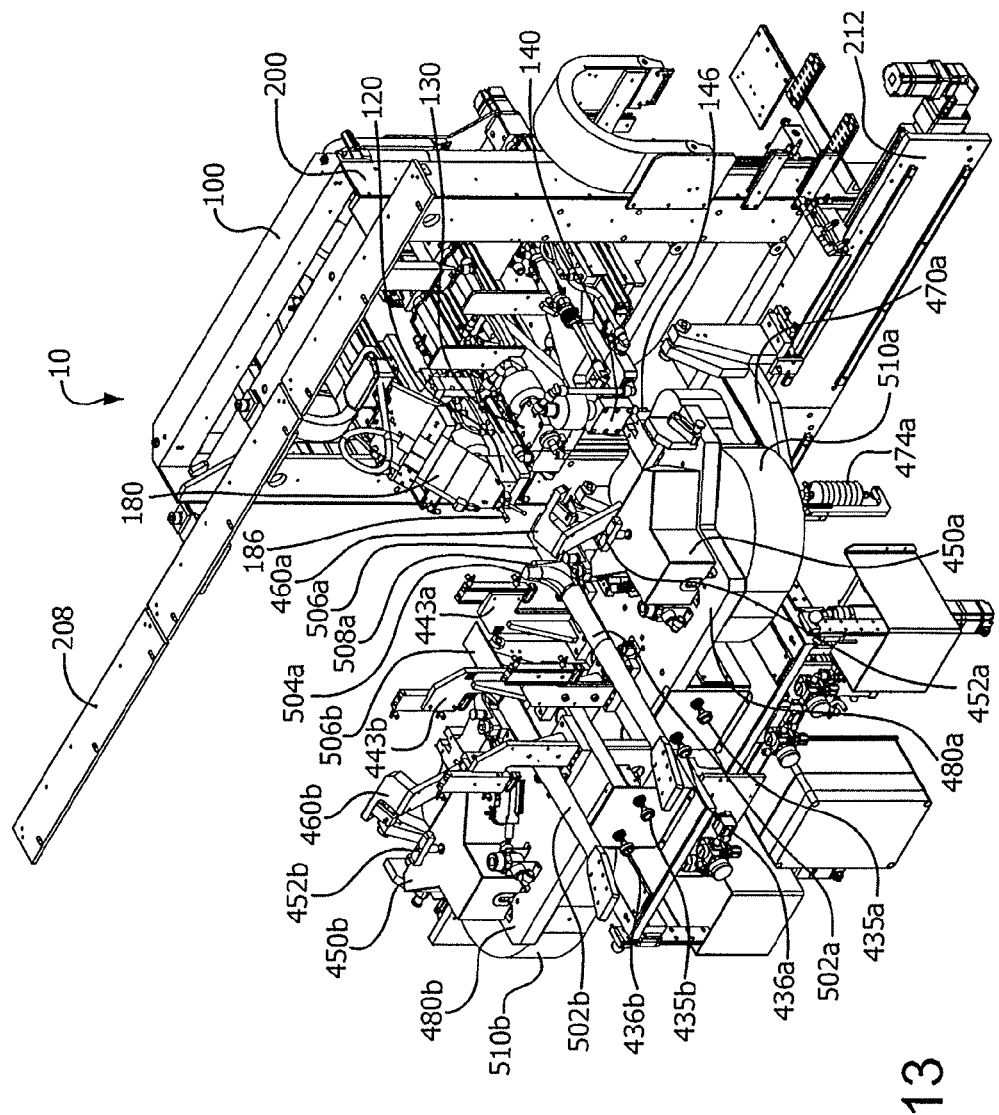
FIG. 13 shows a top perspective of a guitar neck joint routing system.
Figure 14:
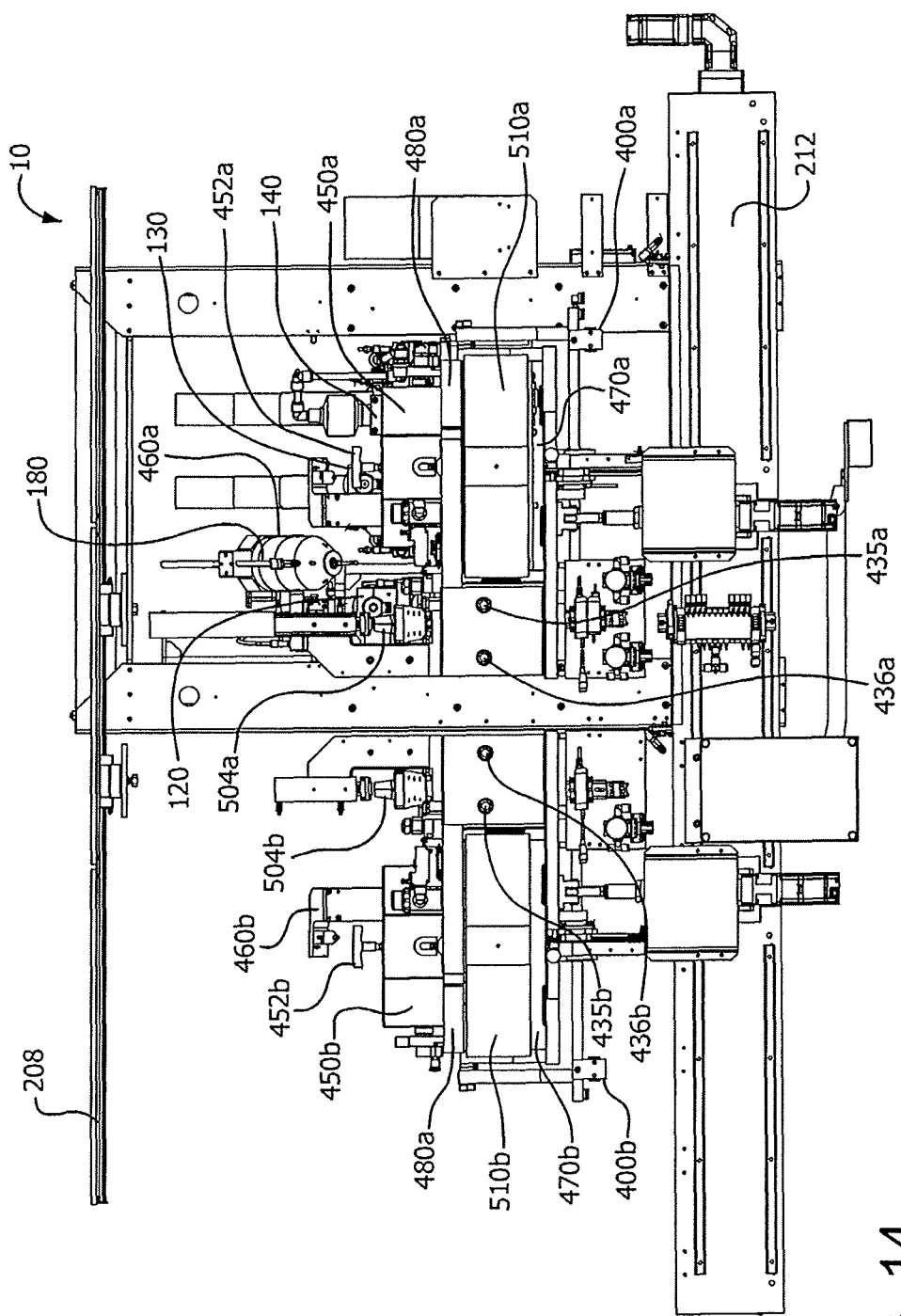
FIG. 14 shows a front perspective of a guitar neck joint routing system.

FIGS. 12, 13, and 14 show positioning of the neck and body nest 400 proximate to the probe and router assembly 100. For example, FIG. 12 shows a side view of the nest 400 containing a guitar body 510 and a guitar neck 502, and of the assembly 100, including the probe 180 and the third router 140 in the cutting position.

The neck and body nest 400 may comprise two mirror image portions. FIG. 13 and FIG. 14 show one such embodiment with a guitar body 510a and 510b held in place between a body clamp 480a and 480b and body platen 470a and 170b, and a guitar neck 502a and 502b held in place between the upper neck platen (not labeled) and the lower neck platen (not labeled) and the upper neck clamp (not labeled) and lower neck clamp (not labeled) in each portion. Having two mirror image portions of the neck and body nest 400a and 400b allows a user to process up to two guitar bodies 510a and 510b and two guitar necks 502a and 502b at a given time. For example, the user may position one set of a guitar body 510b and guitar neck 502b, while the probe and router assembly 100 measures and routs another set of a guitar body 510a and guitar neck 502a.

Operation of the system 10 is preferably controlled using the PLC 30. In some aspects, the PLC 30 is programmed to control the measurement and cutting of portions of the guitar neck 502 and the guitar body 510 to create a male portion 508 of a dovetail joint 508, 518 on the neck 502 and a female portion 518 of a dovetail joint 508, 518 on the body 510. The PLC 30 preferably comprises a human machine interface 32 to enable a human being to operate the system 10, and a programmable logic controller processor (not shown). The PLC processor comprises at least one programmable logic controller input (not shown) and at least one programmable logic controller output (not shown) for sending and receiving signals, respectively, to and from other components of the system 10. The PLC processor preferably comprises a memory.

The PLC 30 may comprise executable code for causing a programmable processor to cause the probe 180 to measure portions of the guitar neck 502, including the neck heel 504, the finger board 506 and the rough-cut male portion 508 of the dovetail joint 508, 518, and to measure portions of the guitar body 510, including the front surface 512, the shoulder 514, and the female portion 518 of the dovetail joint 508, 518. The PLC 30 may comprise executable code for causing a programmable processor to cause the face probe 454 to measure portions of the front face 512 of the guitar body 510. The PLC 30 may comprise executable code for causing a programmable processor to cause the nest actuator 478 to move and/or pivot the nest 400 among various angles about the x axis for adjusting the angle of the guitar body 510 during cutting. The PLC 30 may comprise executable code for causing a programmable processor to calculate aspects of the geometric and surface features of the neck 502 and body 510, including whether the front face 512 is flat, concave, or convex, neck angle deviations from a threshold angle (e.g., about 90 degrees, including about 89.37 degrees), finger board 506 thickness, angle of perpendicularity or angle of non-perpendicularity of the male portion 508 of the dovetail joint 508, 518 to the finger board 506, the dimensions of the finger board 506 and heel 504, the top drop angle, and horizontal position of the shoulder, among others. The PLC 30 may comprise executable code for causing a programmable processor to cause the first router 120, the second router 130, and the third router 140 to cut/rout portions of the front face 512, and shoulder 514 of the guitar body 510 in order to create a finely-cut female portion 518 of the dovetail joint 508, 518 according to the unique geometry, shapes, dimensions, angles, imperfections, and other surface features measured from a neck 502 and body 510 set. The PLC 30 may comprise executable code for causing a programmable processor to cause the first router 120, the second router 130, and the third router 140 to cut/rout portions of the guitar neck 502 in order to create a finely-cut male portion 508 of a dovetail joint 508, 518 according to the unique geometry, shapes, dimensions, angles, imperfections, and other surface features measured from a neck 502 and body 510 set. The fine cuts permit the neck 502 and body 510 to be joined together by matching the finely cut male portion 508 and female portion 518 of the dovetail joint 508, 518 during assembly of a guitar.

The executable code may cause a programmable processor to carry out an operational logic used in operation of the system 10 that enables measurement of the neck 502, body 510, and front surface 512, calculation of dimensions needed for the male portion 508 and/or female portion 518 of the dovetail joint 508, 518, and positioning and movement of the nest 400 (and with it, the body 510 held in place in the nest 400) and of each of the first router 120, second router 130, and third router 140 for making cuts in the wood. FIGS. 15-24 show one non-limiting embodiment of a logic that can be used to create executable code and/or used in the operation of the system 10. FIG. 15a through FIG. 15e illustrate measurements taken on each of the neck 502 and body 510 according to the operational logic.

During operation of the system 10, a user may position a guitar neck 502 onto the upper neck platen 430 and lower neck platen 431 of the nest 400, with the front face of the finger board 506 facing downward toward the body clamp 480 and with the neck heel 504 proximate to the lower neck platen 431. Once the guitar neck 502 is in the proper position, the user may secure the neck 502 in place by sliding the upper neck clamp 438 and the lower neck clamp 440 downward to contact the surface of the neck 502. In some aspects, by manually adjusting either or both of the upper neck clamp adjustment knob 436 or the lower neck clamp adjustment knob 435, the user adjusts the movement or pressure of the upper neck clamp 438 or the lower neck clamp 440, respectively. Optionally, in some aspects, the user may lock the clamps 438 and 440 in place.

The user may position a guitar body 510 onto the body platen 470 of the nest 400. The user may move the neck joint locator 460 downward, and insert the joint locator pin 462 into the neck joint locator pin hole 516 located on the front face 512 and near to the shoulder 514 of the body 510. Optionally, the user may insert the bottom pin locator 466 into the bottom pin hole 522 of the guitar body 510. Once the guitar body 510 is in the proper position, the user may activate the vacuum source 484a-f by turning the T-handle 452 into the "on" position, to create a vacuum through each of the vacuum grips 482a-g, which will create suction between the front face 512 of the guitar body 510 and the bottom surface 481 of the body clamp 480, thereby securing the body 510 in place. With the guitar body 510 secured in place via the vacuum, the user may remove the joint locator pin 462 from the neck joint locator pin hole 516 by lifting the neck joint locator 460 upward, and away from the shoulder 514 of the body 510, particularly so that the neck joint locator 460 does not interfere with the measuring and cutting tools that will contact the neck 502 and body 510.

With the guitar body 510 and guitar neck 502 secured in place, the user may activate the system 10. With the specific aspects controlled, in part, by the operational logic of the PLC 30, the probe 180 may measure the dimensions, plane, angles, contours, geometry, surface features, and other features of the guitar neck 502 and guitar body 510, and the face probe 454 may measure the dimensions, plane, angles, contours, geometry, surface features, and other features of the front face 512 of the body 510. Thus, for example, the PLC 30 may cause the probe actuator 194 to move the probe 180 or probe shuttle 192 forward and backward along a z-plane along the probe track 190, and may cause the probe plane actuator 198 to move the probe 180 in any necessary direction to allow the sensor tip 186 to measure aspects of the neck 502 and body 510. The PLC 30 may further cause the face probe actuator to move the face probe 454 to allow the face probe sensor tip 455 to measure aspects of the front face 512 of the body 510, particularly in the bridge locus area.

Figure 15A:
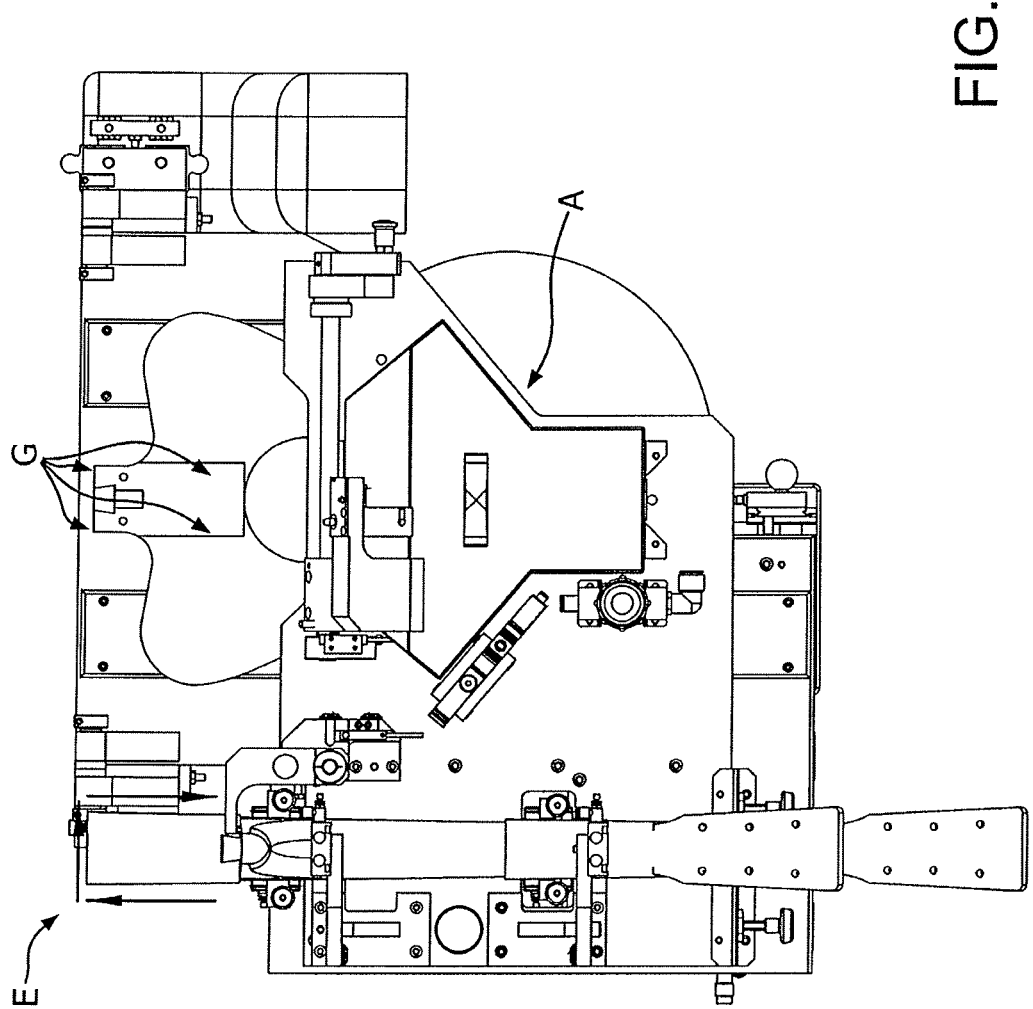
FIG. 15a shows a graphical illustration of measurements taken by a guitar and neck routing system.

In some aspects, the system 10 measures the portion of the front face 512 of the body 510 where a bridge will be mounted, for example, using the face probe 454. As shown in FIG. 15a, and in view of the logic diagrams of FIG. 16 and FIG. 18, the face probe tip 455 contacts the front face 512 of the guitar body 510 (FIG. 15a, part (A)), and determines if the bridge locus on the front face 512 is flat, concave, or convex, and communicates such information to the face probe processor 458, which communicates the information to the PLC 30, where the information is stored and processed until routing of the wood commences. As diagrammed in FIG. 18, if the bridge locus of the front face 512 is flat, the PLC 30 may not calculate any adjustments in the shoulder angle on the guitar body 510. If the bridge locus of the front face 512 is concave, the PLC 30 calculates the appropriate forward angle to be cut into a shoulder portion 515 on the shoulder 514 of the body 510. If the bridge locus on the front face 512 is convex, the PLC 30 calculates the appropriate backward angle to be cut into the shoulder portion 515 of the shoulder 514 of the body 510. The calculations are temporarily stored in the memory of the PLC 30, and used to determine the positioning of the body 510 and the first 120, second 130, and third 140 routers during the cutting of the shoulder 514.

Figure 15B:
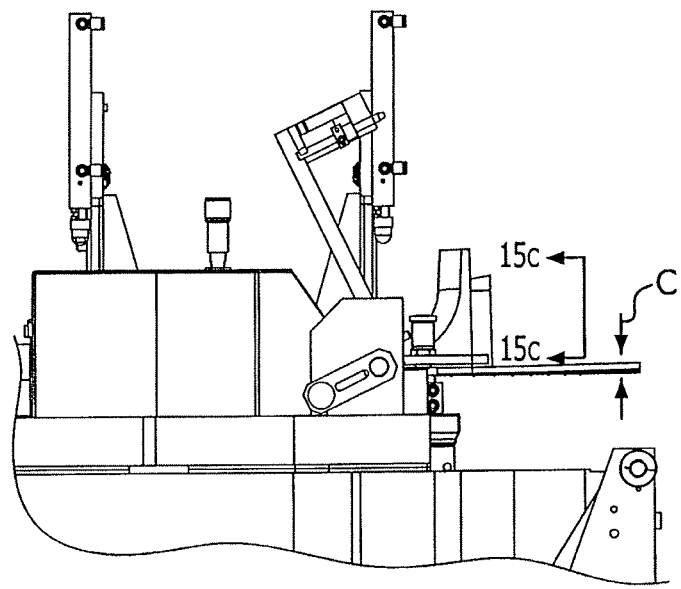
FIG. 15b shows a graphical illustration of additional measurements taken by the guitar and neck routing system.
Figure 15C:
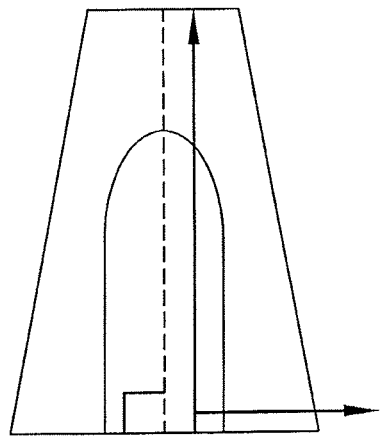
FIG. 15c shows an illustration of a measurement of the male dovetail angle of perpendicularity or non-perpendicularity and is a cross-section taken along the line 15c-15c of FIG. 15b.
Figure 15D:
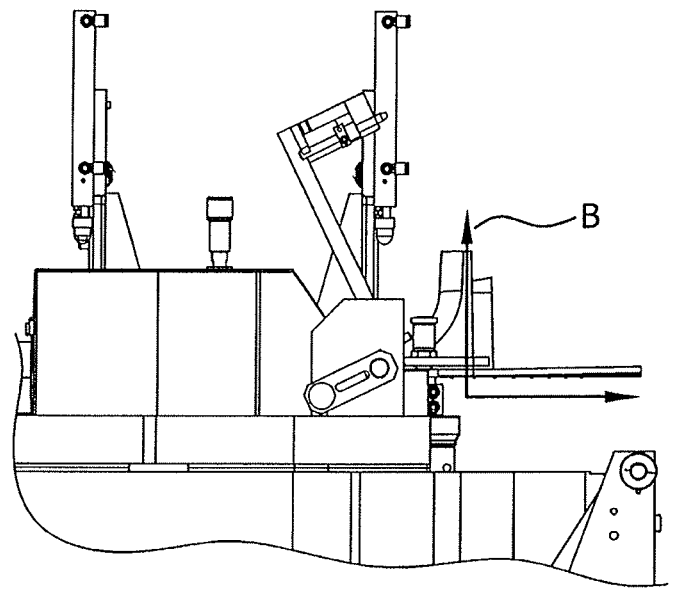
FIG. 15d shows an illustration of additional measurements taken by the guitar and neck routing system.

To ensure proper fitting together of the neck 502 and the guitar 510, the system 10 measures the angle between the heel 504 and the finger board 506, for example, using the probe 180. See FIG. 15d, part (B). As shown in FIG. 15d, and in view of the logic diagrams of FIG. 16 and FIG. 19, the sensor tip 186 of the probe 180 contacts each of the bottom plane of the heel 504 and the back face of the finger board 506, and determines the angle at the junction between each piece, termed the neck angle, and communicates such information to the probe processor 184, which communicates the information to the PLC 30, where the information is temporarily stored and processed until routing of the wood commences. If the neck angle is greater than a threshold angle, the PLC 30 calculates the appropriate forward cut angle to be cut into the shoulder on the body 510. As diagrammed in FIG. 19, if the neck angle is equal to a threshold angle, the PLC 30 may not calculate any adjustments in the angle to be cut into the shoulder portion 515 of the shoulder 514 of the body 510. If the neck angle is less than a threshold angle, the PLC 30 calculates the appropriate backward cut angle to be cut into the shoulder portion 515 of the shoulder 514 of the body 510. The threshold angle may be about 88, about 89, about 90, about 91, or about 92 degrees. Preferably, the threshold angle is about 89 degrees, and more preferably is 89.37 degrees. The calculations are temporarily stored in the memory of the PLC 30, and used to determine the positioning of the body 510 and the first 120, second 130, and third 140 routers during cutting of the shoulder 514.

To ensure a proper bridge height, the finger board 506 should be seated properly in the guitar body 510. In this regard, the system 10 measures the thickness of the finger board 506, for example, using the probe 180. As shown in FIG. 15b (part (C), and in view of the logic diagrams of FIG. 16 and FIG. 20, the sensor tip 186 of the probe 180 contacts each plane of the bottom portion the finger board 506 and determines the thickness of the finger board 506, and communicates the thickness to the probe processor 184, which communicates the thickness to the PLC 30, where the information is temporarily stored and processed until routing of the wood commences.

Figure 20:
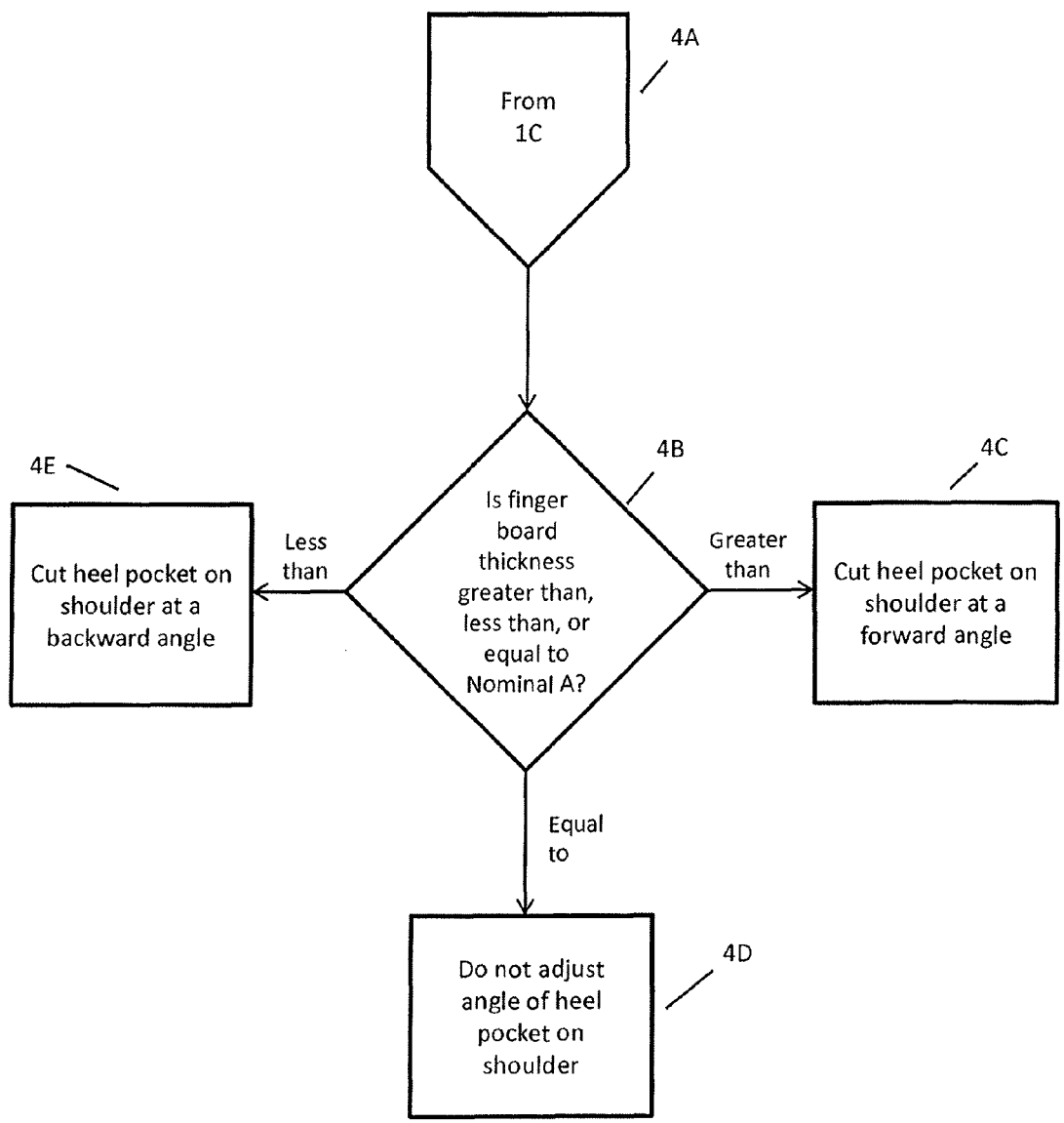
FIG. 20 shows a logic flow diagram for determining the thickness of a finger board.
Figure 21:
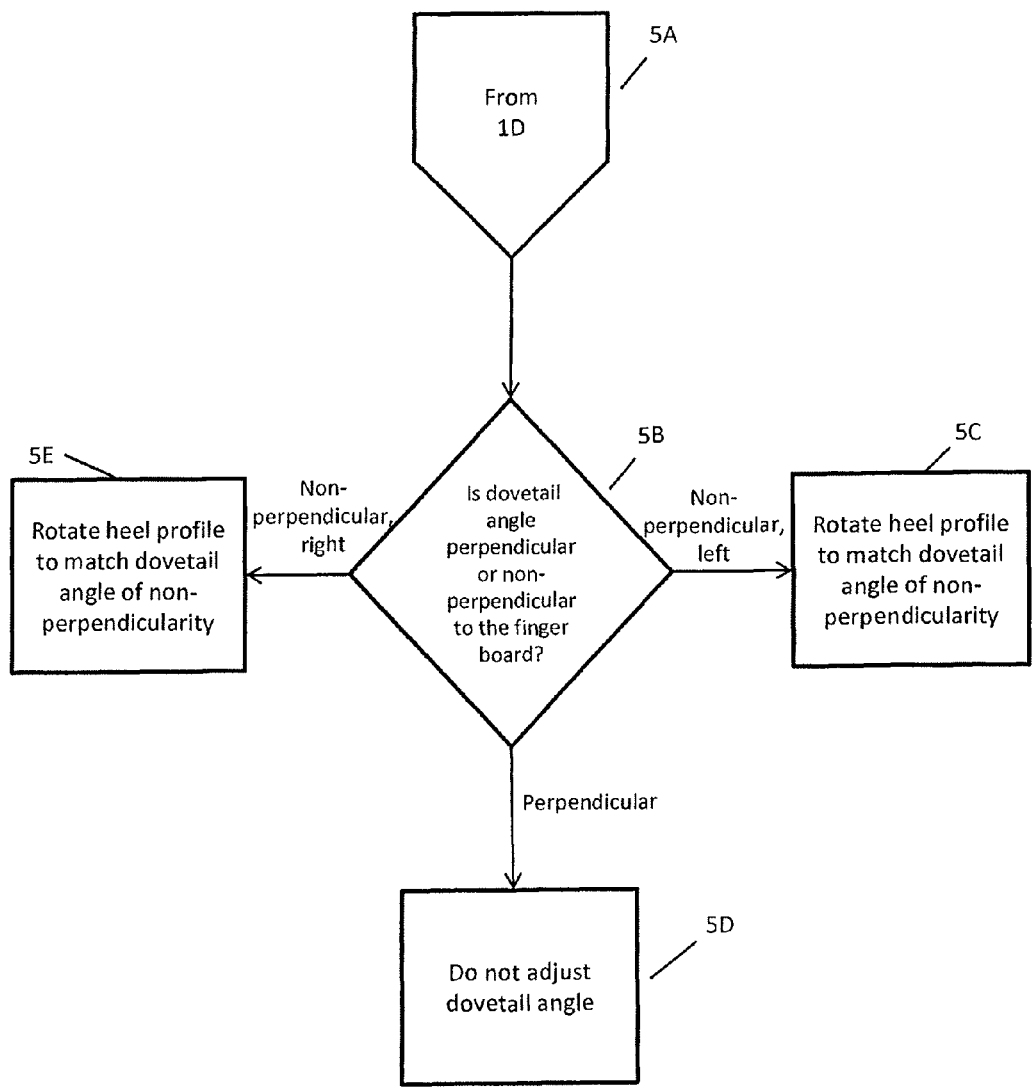
FIG. 21 shows a logic flow diagram for determining whether a dovetail angle is perpendicular or non-perpendicular.

The appropriate thickness of the finger board 506 is pre-programmed into the PLC 30, and may depend, for example, on the particular model of guitar. The desired thickness is termed the Nominal thickness, and as presented in FIG. 20, is termed Nominal A. Thus, the probe 180 determines deviations from the Nominal thickness in terms of whether the finger board 506 of the neck 502 being processed is greater than or less than the established value for the Nominal thickness, Nominal A. The PLC 30 calculates the appropriate angle to be cut into the shoulder 514 of the guitar body 510 to allow the finger board 506 to be seated properly in the body 510. If the finger board thickness is determined to be greater than Nominal A, the PLC 30 calculates the difference in thickness to be cut into the shoulder 514, for example, by creating a forward cut heel pocket angle in the shoulder 514. If the finger board thickness is determined to be less than Nominal A, the PLC 30 calculates the difference in thickness to be cut into the shoulder 514, for example, by creating a backward cut heel pocket angle. If the finger board thickness is equal to Nominal A, the PLC 30 may not calculate any difference in thickness, such that the depth of the shoulder pocket need not be adjusted. The calculations are temporarily stored in the memory of the PLC 30, and used to determine the positioning of the first 120, second 130, and third 140 routers for cutting the shoulder 514.

The sensor tip 186 of the probe 180 also determines the dimensions (e.g., length and width) of the lower portion of the finger board 506 that will be seated into the finger board pocket, such that the length and width dimensions (in addition to the depth) of a finger board pocket may be cut into the front face 512 of the guitar body 510 (FIG. 15a, part (E)). These dimensions are communicated to the probe processor 184, which communicates the dimensions to the PLC 30, which calculates the appropriate length and width to be cut into the front face 512 of the guitar body 510 to allow the finger board 506 to be seated properly in the finger board pocket. The calculations are temporarily stored in the memory of the PLC 30, and used to determine the positioning of the first 120, second 130, and third 140 routers for cutting a finger board pocket in the front face 512. In some aspects, the PLC 30 creates a digital profile for both the finger board 506 edge and the heel 504 edge into a plurality of points, and uses these points to calculate the required path of one or more of the first router 120, second router 130, or third router 140.

The male portion 508 of the dovetail joint 508, 518 preferably aligns properly with the female portion 518 of the dovetail joint 508, 518. To ensure that each portion 508 and 518 aligns and fits together properly, the system 10 measures the angle of the male portion 508 of the dovetail joint relative to the plane of the front face of the guitar neck 502, for example, by using the probe 180. See FIG. 15b and FIG. 15c. In view of the logic diagrams of FIG. 16 and FIG. 21, the sensor tip 186 of the probe 180 contacts the male portion 508 of the dovetail joint 508, 518 and determines whether the male portion 508 is positioned on the bottom face of the heel 504 perpendicular or non-perpendicular to the front (and rear) plane of the guitar neck 502. If the male portion 508 is not perpendicular, the sensor tip 196 determines the angle of non-perpendicularity, and communicates that information to the probe processor 184, which communicates the information to the PLC 30, where the information is temporarily stored and processed until routing of the wood commences.

If the angle is perpendicular, the PLC 30 may not calculate any adjustments in the dovetail angle to be cut into the heel pocket. If the angle is non-perpendicular (the angle of non-perpendicularity), and is off-position to the left direction, the PLC 30 calculates the appropriate angle to be cut into the left side of the heel pocket. If the angle is non-perpendicular (the angle of non-perpendicularity), and is off-position to the right direction, the PLC 30 calculates the appropriate angle to be cut into right side of the heel pocket. The calculations are temporarily stored in the memory of the PLC 30, and used to determine the positioning of the first 120, second 130, and third 140 routers for cutting the heel pocket.

Figure 15E:
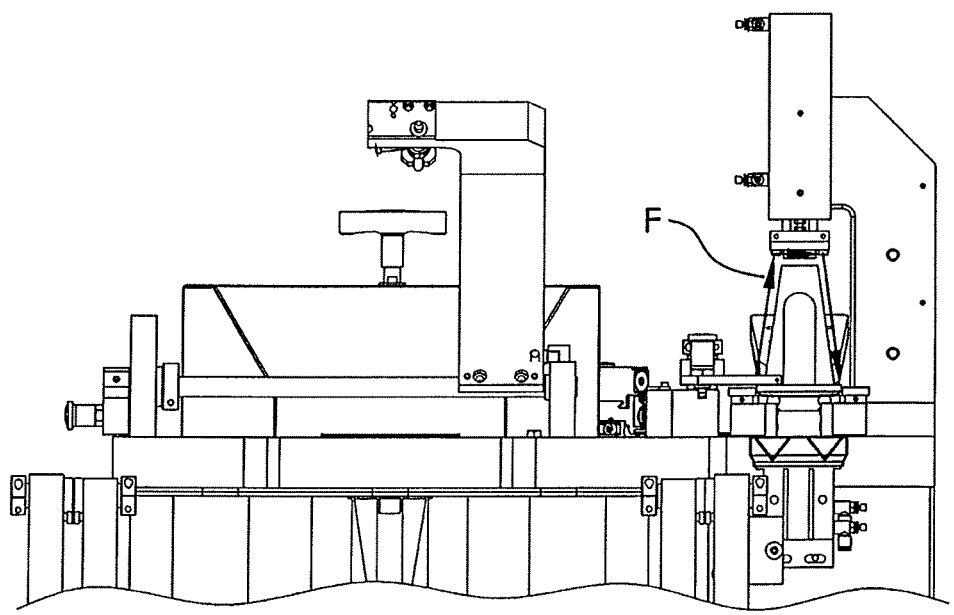
FIG. 15e shows an illustration of additional measurements taken by the guitar and neck routing system.
Figure 16:
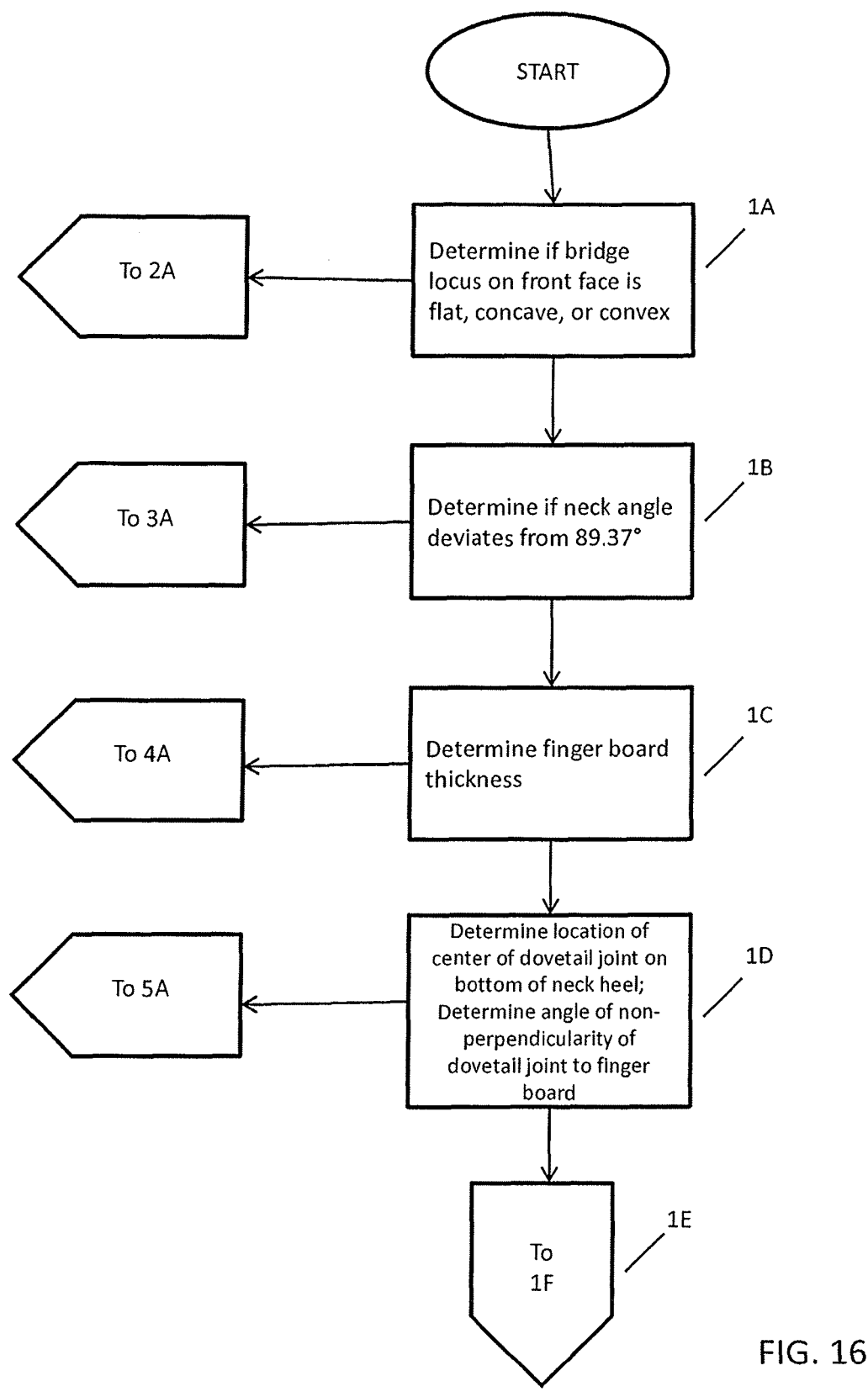
FIG. 16 shows a logic flow diagram for determining the geometry and surface features of a guitar neck and a guitar body.
Figure 17:
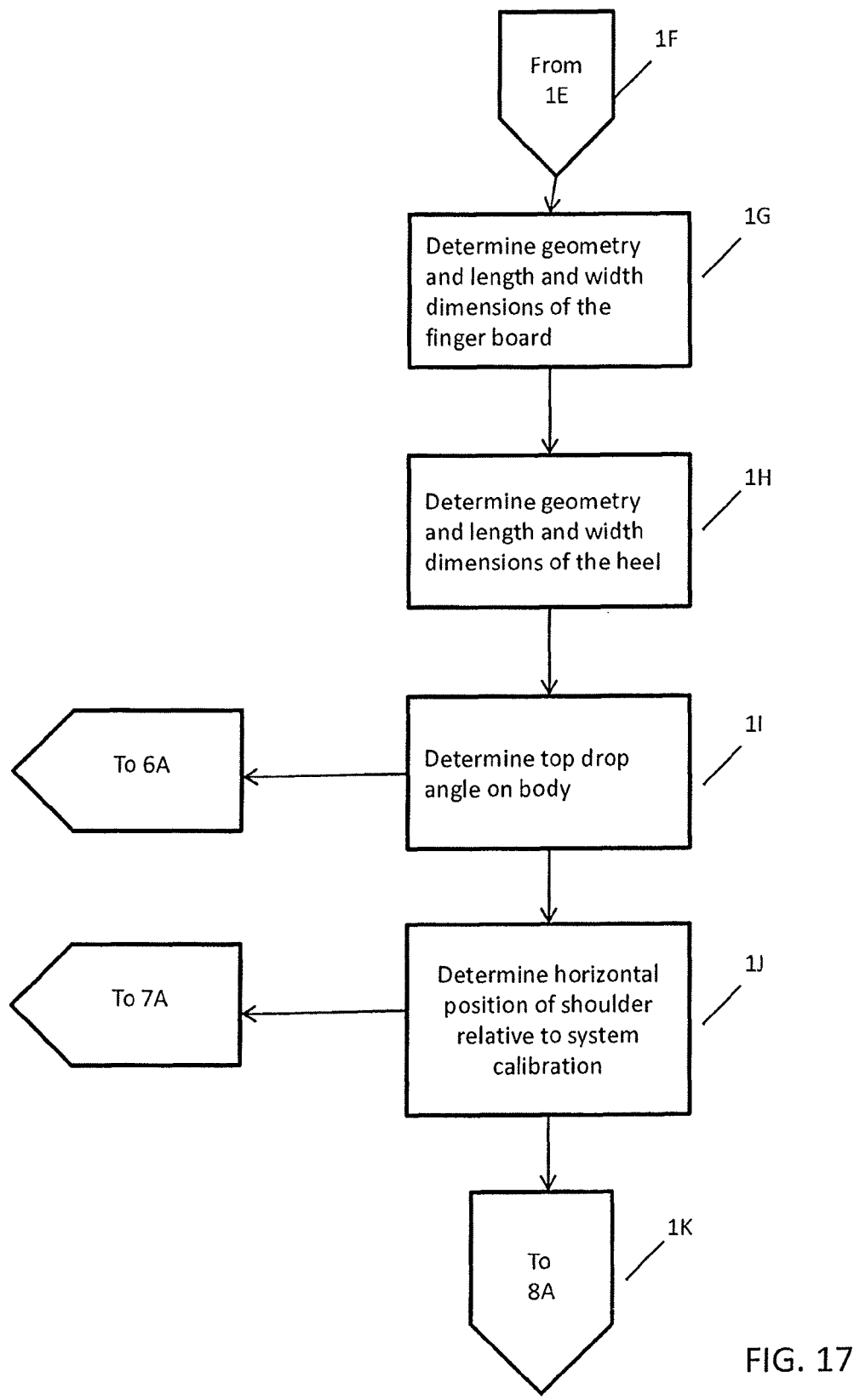
FIG. 17 is a continuation of FIG. 16, and shows a logic flow diagram for geometry and surface features of a guitar neck and a guitar body.
Figure 18:
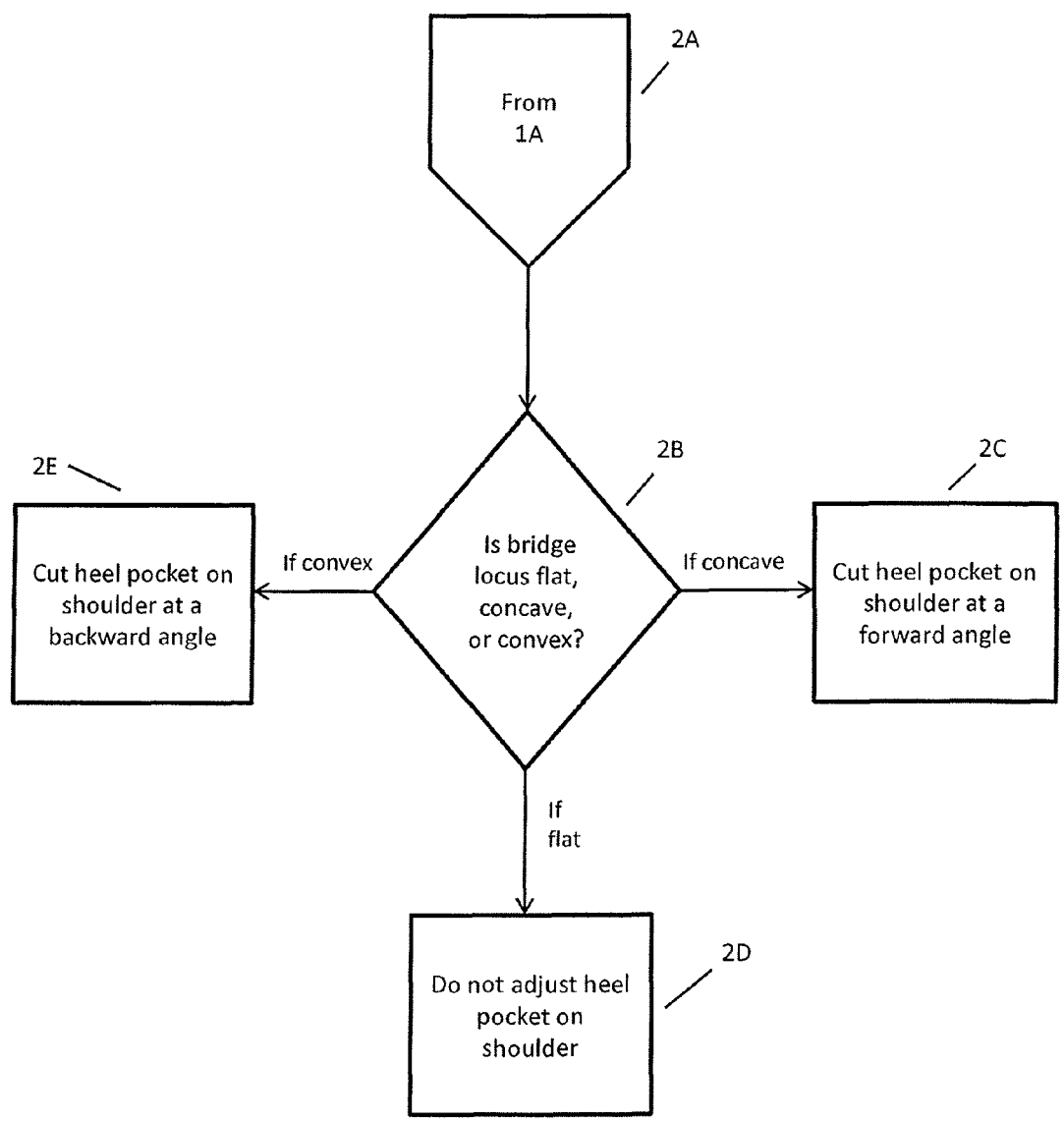
FIG. 18 shows a logic flow diagram for determining the features of the front face of a guitar body in the area where a bridge will be mounted.
Figure 19:
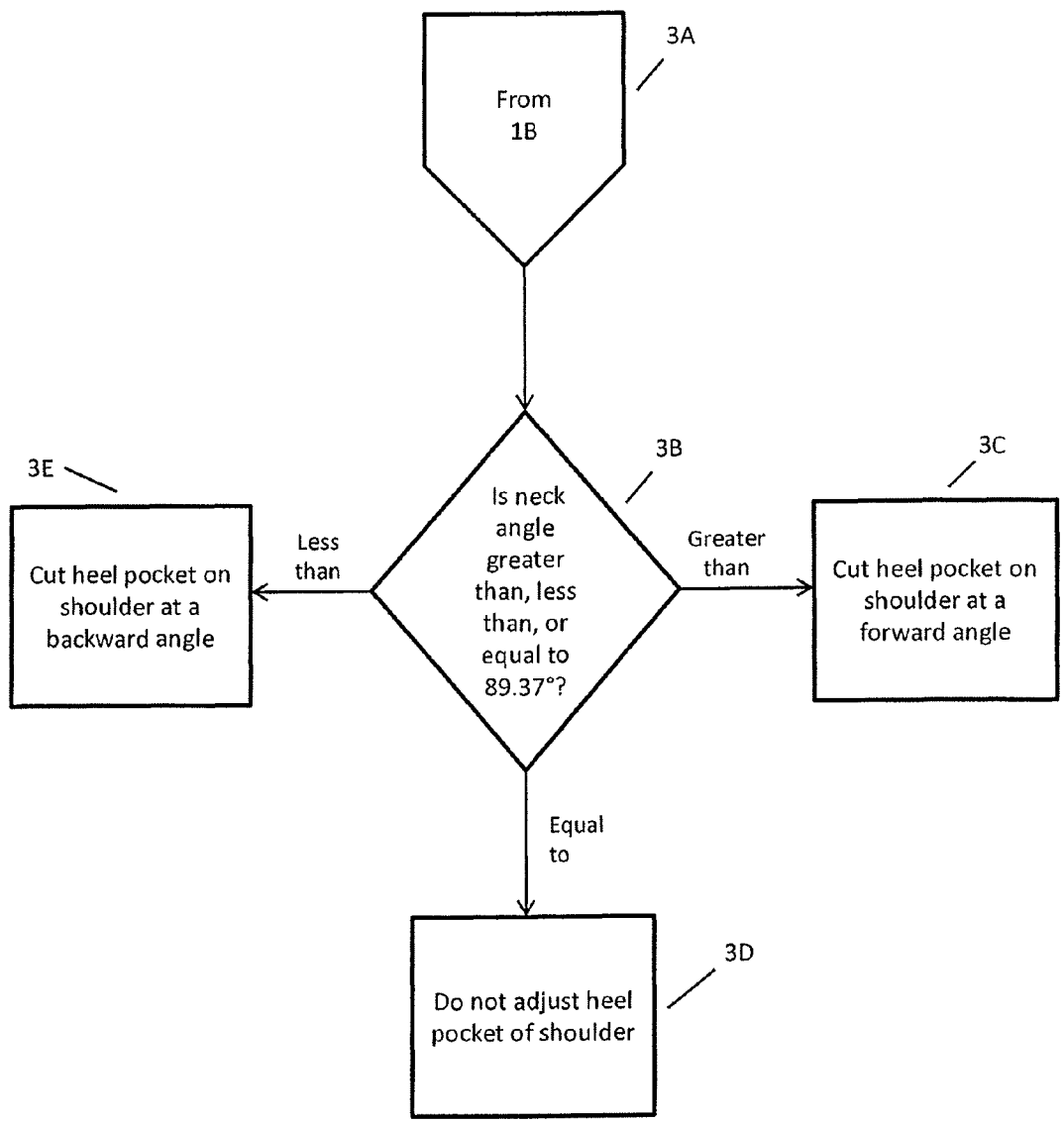
FIG. 19 shows a logic flow diagram for determining the neck angle on a guitar neck.

The system 10, for example, by using the sensor tip 186 of the probe 180, also determines the dimensions (e.g., length and width) of the heel portion 504 of the neck 502 (FIG. 15e, part (F) and FIG. 17) that will be seated into a heel pocket, such that the length and width dimensions (in addition to the depth) of the heel pocket may be cut into the shoulder 514 of the guitar body 510. These dimensions are communicated to the probe processor 184, which communicates the dimensions to the PLC 30, which calculates the appropriate length and width to be cut into the top of the guitar body 510 to allow the heel 504 to be seated properly in the heel pocket. The calculations are temporarily stored in the memory of the PLC 30, and used to determine the positioning of the body 510 and the first 120, second 130, and third 140 routers during routing of a heel pocket into the shoulder 514.

The top drop angle is also measured by the probe 180 to help ensure that the guitar neck 502 and guitar body 510 come together properly. For example, as shown in FIG. 15a, part (G), and according to the logic diagrams of FIG. 17 and FIG. 22, the sensor tip 186 of the probe 180 contacts the top portion of the front face 512 and determines the top drop angle, and communicates this information to the probe processor 184, which communicates the top drop angle to the PLC 30, where the information is temporarily stored and processed until routing of the wood commences.

Figure 22:
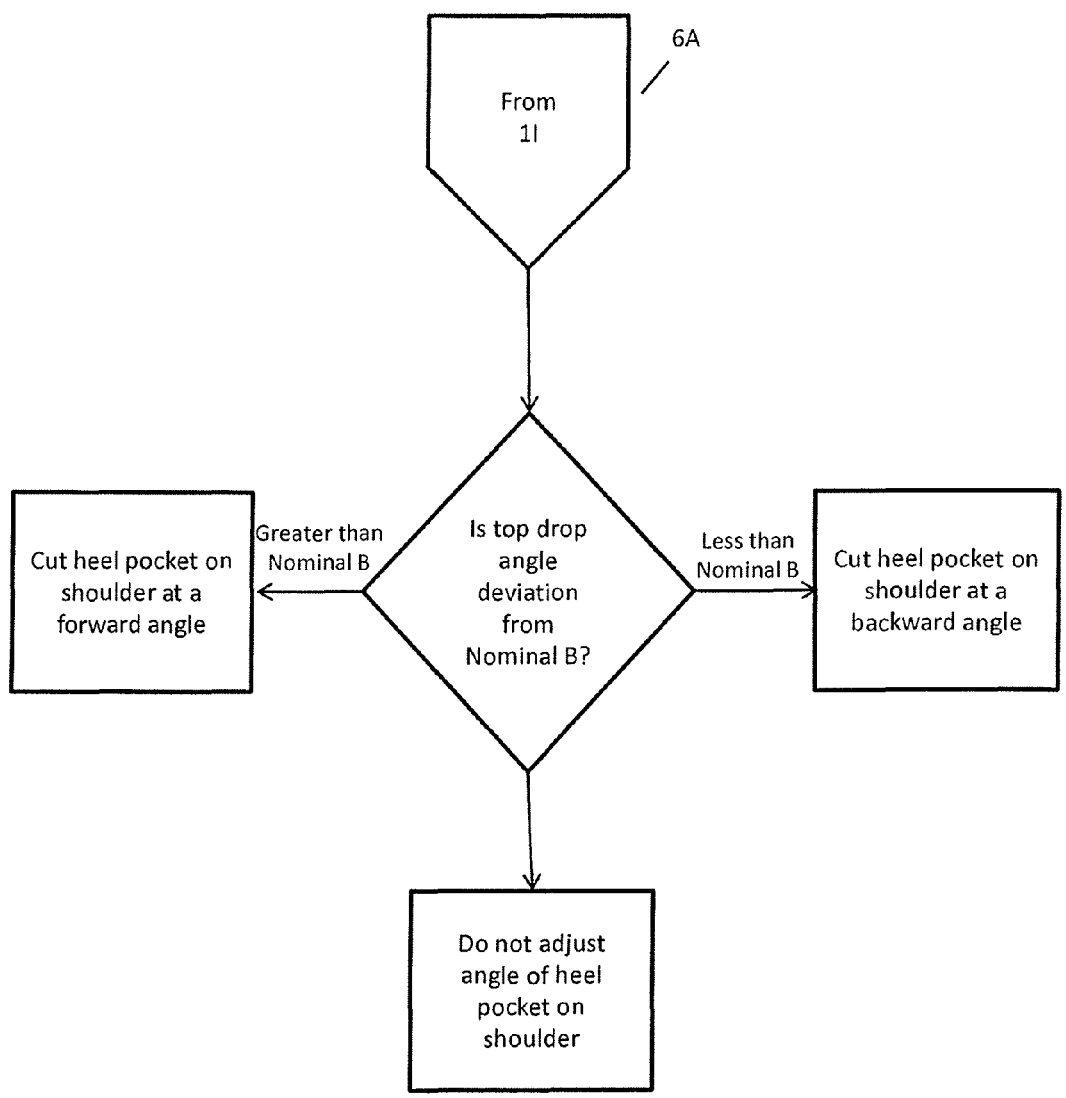
FIG. 22 shows a logic flow diagram for determining the deviation from a top drop standard.
Figure 23:
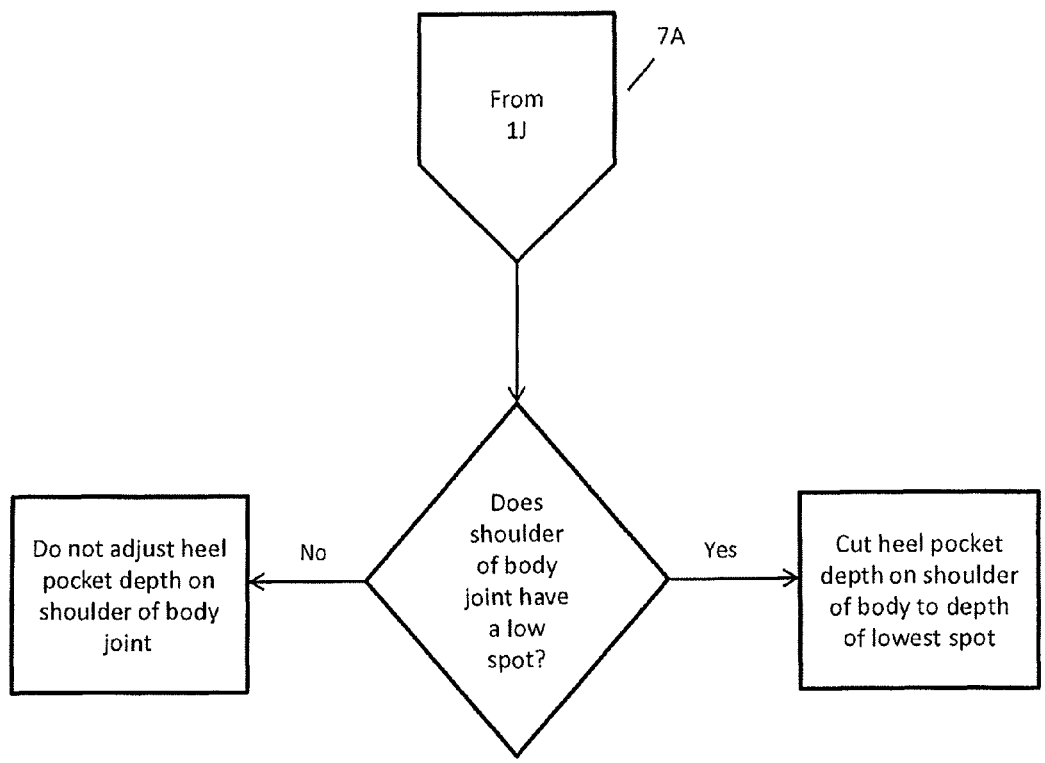
FIG. 23 shows a logic flow diagram for determining low spots on shoulder body joint surface.
Figure 24:
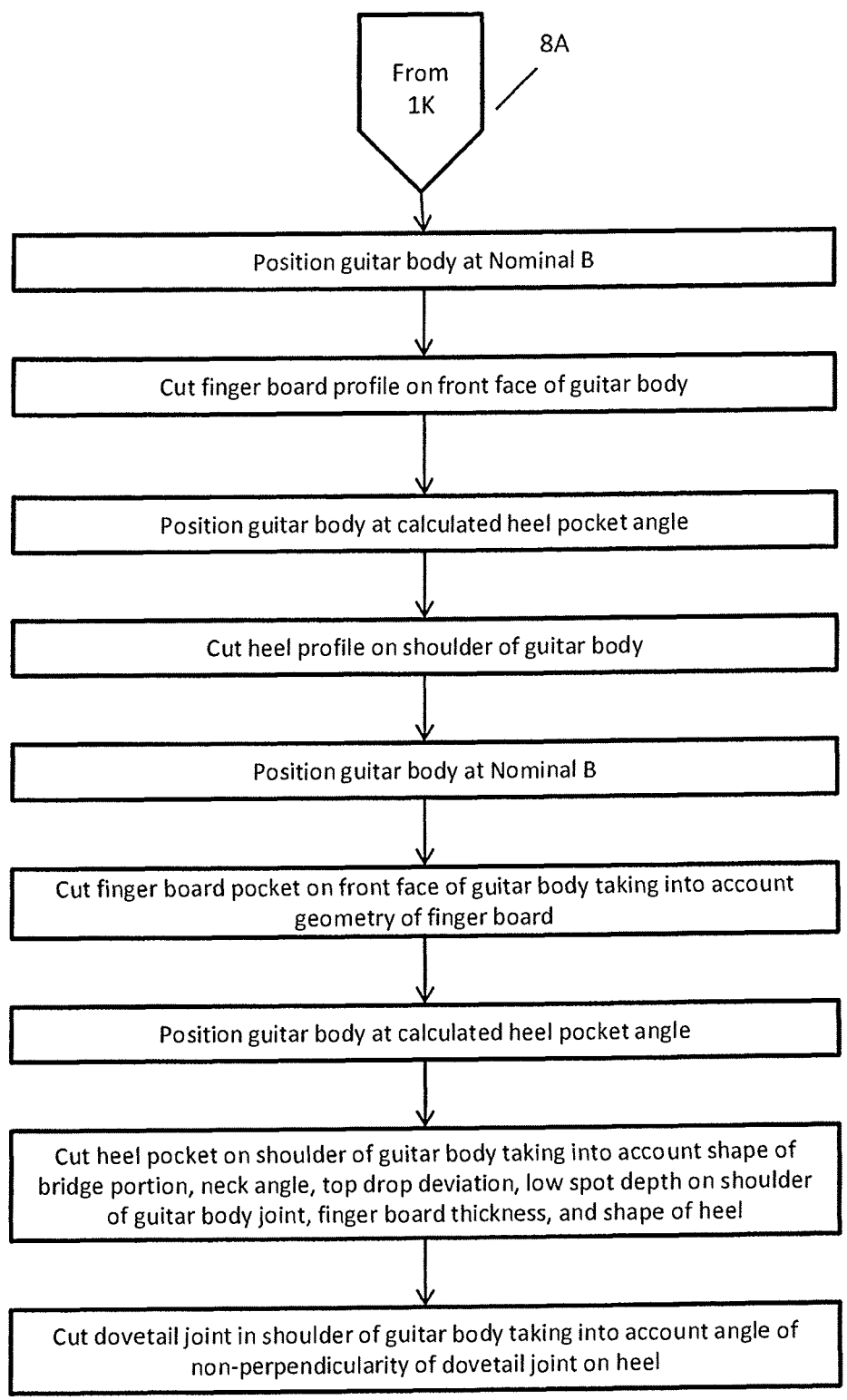
FIG. 24 shows a logic flow diagram for cutting a guitar neck and guitar body.

The appropriate top drop angle is pre-programmed into the PLC 30, and may depend, for example, on the particular model of guitar. The desired top drop angle is termed the Nominal top drop angle and, as presented in FIG. 22, is termed Nominal B. In some aspects, Nominal B is about 0.4 degrees. In some aspects, Nominal B is about 0.47 degrees. Thus, the probe 180 determines deviations from the Nominal top drop angle in terms of whether the top drop angle of the guitar body 510 being processed is greater than or less than the established value for the Nominal top drop angle, Nominal B. If the top drop angle on the guitar body 510 is equal to Nominal B, no adjustments may be made to the shoulder angle. If the top drop angle on the guitar body 510 is less than Nominal B, the PLC 30 calculates the appropriate backward angle to be cut into the shoulder 514 of the guitar body 510. If the top drop angle is greater than Nominal B, the PLC 30 calculates the appropriate forward angle to be cut into the shoulder 514 of the guitar body 510. The calculations are temporarily stored in the memory of the PLC 30, and used to determine the positioning of the guitar body 510 and the first 120, second 130, and third 140 routers during cutting of the shoulder 514.

An uneven shoulder surface 515 may introduce undesired imperfections in the fit between the guitar neck 502 and the guitar body 510. Thus, the system 10 measures the shoulder surface 515 at the shoulder 514 of the guitar body, for example, using the probe 180. As recited in the logic diagrams of FIG. 17 and FIG. 22, the sensor tip 186 of the probe 180 contacts the shoulder surface 515, determines if there are any low spots, and measures the depth of such low spots. The depth of the low spot(s) is (are) communicated to the probe processor 184, which communicates the dimensions to the PLC 30, which calculates the appropriate depth to be cut into the shoulder surface 515 on the guitar body 510 to allow the heel 504 to mate snugly with the shoulder surface when the guitar is assembled.

Any adjustments in the plane of the shoulder surface 515 are geared toward the lowest depth among any low spots identified. If no low spots are detected, the PLC 30 may not calculate any adjustments to the shoulder surface 515. If a low spot is detected, the PLC 30 calculates the depth to cut from the shoulder surface 515. The calculations are temporarily stored in the memory of the PLC 30, and used to determine the positioning of the guitar body 510 and the first 120, second 130, and third 140 routers for cutting the shoulder 514.

Having measured appropriate aspects of the guitar neck 502 and guitar body 510, the system 10 automatically commences cutting of portions of the guitar neck 502 and the guitar body 510. The PLC 30 causes the hoist actuator 206 to move the hoist 202 to raise or lower the probe and router assembly 100 to the appropriate height of the guitar neck 502 and guitar body 510 positioned on the nest 400. The PLC 30 may induce actuation of the bottom clamp actuator 474 to move the bottom clamp 472 such that the guitar body 510 positioned in the nest 400 over the top of the bottom clamp 472 is positioned at the proper angle, for example, Nominal B. The PLC 30 may then induce actuation of the first, second, and third 174 router actuator and the first, second, and third 178 hinge actuator to move the first 120, second 130, and third 140 routers, respectively, to cut portions of the guitar neck 502 and guitar body 510. In one non-limiting embodiment, cutting of the guitar neck 502 and guitar body 510 may proceed according to the logic flow shown in FIG. 24. The order of cutting steps may vary.

Actuation of the first router actuator moves the first shuttle 152 and, with it, the first router 120, outward along the first track 150 toward the nest 400 having a guitar neck 502 and guitar body 510 secured in place. Actuation of the first hinge actuator moves the first router 120 to its position in a vertical plane such that the first cutting tool 126 points downward, and the first cutting tool 126 cuts a finger board pocket profile onto the front face 512 of the guitar body 510 and, if necessary, finely cuts the edges of the corners of the lower portion of the finger board 506 such that the edges of the finger board 506 and the finger board pocket in-the-making align. The finger board pocket profile takes into account the determined geometry and dimensions of the lower portion of the finger board 506.

The PLC 30 may induce actuation of the nest actuator 478 to move the nest 400 such that the guitar body 510 in the nest 400 is positioned into the calculated heel pocket angle. Once the body 510 is positioned at the proper angle, the first router 120 cuts a heel pocket profile onto the shoulder 514 of the guitar body 510 and, if necessary, finely cuts the edges of the corners of the heel 504 such that the edges of the heel 504 and the heel pocket in-the-making align. The heel pocket profile takes into account the determined geometry and dimensions of the heel 504. Following the cutting of a heel pocket profile, the first router 120 is moved back into its position in a horizontal plane via the first hinge actuator and the first router actuator moves the first shuttle 152 and, with it, the first router 120 inward along the first track 150 back toward the gantry 200. In addition, following the cutting of a heel pocket profile, the guitar body 510 is re-positioned at Nominal B.

The PLC 30 may next induce actuation of the second router actuator, which in turn moves the second shuttle 162 and, with it, the second router 130 outward along the second track 160 toward the nest 400. Actuation of the second hinge actuator moves the second router 130 to its position in a vertical plane such that the second cutting tool 136 points downward, and the second cutting tool 136 cuts a finger board pocket on the front face 512 of the guitar body 510, taking into account the geometry and the thickness of the finger board 506. After the finger board pocket is cut, the body 510 is positioned at the calculated heel pocket angle, and the second router 130 is re-positioned and cuts a heel pocket between the heel pocket profile on the shoulder 514 of the guitar body 510. Cutting of a heel pocket takes into account the shape of the bridge portion of the front face 512, the neck angle, top drop deviation, the depth of any low spots on the shoulder 514, and the shape of the heel 504.

The PLC 30 may induce actuation of the nest actuator 478 to move the nest 400 such that the guitar body 510 in the nest 400 is re-positioned at Nominal B. Once the body 510 is re-positioned at Nominal B, the second router 130 (via the second cutting tool 136) may then cut the finger board pocket between the finger board pocket profile on the front face 512 of the guitar body 510. The finger board pocket takes into account the calculations of the depth of the finger board 506. Following the cutting of the finger board pocket, the second router 130 is moved back into its position in a horizontal plane via the second hinge actuator, and the second router actuator moves the second shuttle 162 and, with it, the second router 130 inward along the second track 160 back toward the gantry 200.

The PLC 30 may then induce actuation of the nest actuator 478 to move the nest 400 such that the guitar body 510 in the nest 400 is re-positioned into the calculated heel pocket angle. The PLC 30 may next induce actuation of the third router actuator 174, which in turn moves the third shuttle 172 and, with it, the third router 140 outward along the third track 170 toward the nest 400. Actuation of the third hinge actuator 178 moves the third router 140 to its position in a vertical plane such that the third cutting tool 146 points downward, and the third cutting tool 146 cuts the female portion 518 of the dovetail joint 508, 518 into the shoulder 514 of the guitar body 510. Following the cutting of the female dovetail joint 518, the third router 140 is moved back into its position in a horizontal plane via the third hinge actuator 178 and the third router actuator 174 moves the third shuttle 172 and, with it, the third router 140 inward along the third track 170 back toward the gantry 200.

The male portion of the dovetail joint 508 (FIG. 25a and FIG. 25c) is preferably cut at about a 10 degree angle, and the female portion of the dovetail joint 518 (FIG. 25b) is preferably cut at about an 8 degree angle. It is also preferred that the male portion 508 and the female portion 518 of the dovetail joint 508, 518 is tapered such that a tighter fit with the male portion 508 and, ultimately, a tighter fit between the guitar neck 502 and the guitar body 510 can be achieved (FIG. 25c). The taper 517 on the male portion 508 and the female portion 518 of the dovetail joint 508, 518 is preferably about 0.028 inches per side of the dovetail, for a total of about 0.056 inches (1.422 mm) of tapering. The taper 517 is preferably about 0.0265 inches (0.673 mm) to about 0.0295 inches (0.749 mm) per side, for a total of about 0.053 inches (1.346 mm) to about 0.059 inches (1.499 mm) in total tapering. The taper 517 is cut into the female portion 518 by the third cutting tool 146 of the third router 140 during the routing of the shoulder 514 of the guitar body. Thus, the female portion 518 of the dovetail joint 508, 518 comprises about an 8 degree angle on each side, and comprises a taper 517 of about 0.0265 inches (0.673 mm) to about 0.0295 inches (0.749 mm) per side.

In some preferred aspects, the male portion 508 is about 10 degrees, with about a 0.922 inches (25.197 mm) width at the widest end of the dovetail 508. The female portion 518 is about 8 degrees, with about a 0.935 inch (23.749 mm) width at the widest opening. The depth of the female portion 518 is about 0.696 inches (17.678 mm) and of the male portion 508 is about 0.559 inches (14.199 mm). This geometry provides the ultimate tight fit because the wood is compressed in the dovetail joint 508, 518 due to the different dimensions of the male portion 508 and the female portion 518.

A dovetail joint 508, 518 comprising a female portion 518 having about an 8 degree angle on each side and a taper 517 of about 0.0265 inches to about 0.0295 inches per side, and comprising a male portion 508 having about a 10 degree angle on each side and a taper 517 of about 0.0265 inches (0.673 mm) to about 0.0295 inches (0.749 mm) per side, is thus provided. The dovetail joint 508, 518 joins together a guitar neck 502 and guitar body 510. A guitar body 510 comprising a shoulder 514 having a female portion 518 of a dovetail joint 508, 518 having about an 8 degree angle on each side and a taper 517 of about 0.0265 inches (0.673 mm) to about 0.0295 inches (0.749 mm) per side is provided. A guitar having a dovetail joint 508, 518 comprising a female portion 518 having about an 8 degree angle on each side, a male portion 508 having about a 10 degree angle on each side, and a taper 517 of about 0.0265 inches (0.673 mm) to about 0.0295 inches (0.749 mm) per side is provided.

Once the guitar neck 502 and guitar body 510, and their subparts, have been properly routed/cut, the process is complete. The neck 502 and body 510 including the refined dovetail joint 508, 518 may be removed from the nest 400, and a new neck 502 and un-routed body 510 can be positioned and secured in the nest 400, and the measurement and cutting process can then be repeated. Although placement and positioning of the neck 502 and body 510 are largely carried out manually by a user of the system 10, the subsequent measurements and cutting preferably proceed in an automated manner.

The system 10 is preferably suitable for high throughput routing of a guitar neck 502 and guitar body 510. The measuring and cutting steps may proceed over the course of about 5 minutes or less from start to completion, and more preferably in less than 4 minutes, and even more preferably in less than 3 minutes.

In some aspects, the system 10 may accommodate at least two guitar necks 502a and 502b, and at least two guitar bodies 510a and 510b at one time. For example, as shown in FIG. 13 and FIG. 14, a user may position a second neck 502b and a second body 510b in one half of a nest 400b having two sets of nest components 400a and 400b arranged in a mirror image. As the second neck 502b and second body 510b are positioned by the user, the probe and router assembly 100 may automatically measure and cut a first neck 502a and a first body 510a already placed and secured in the nest 400a. When the measuring of the first neck 502a and cutting of the first body 510a are complete, the probe and router assembly 100 may move laterally along the upper 208 and lower 212 gantry tracks and automatically measure the second neck 502b and cut the second body 510b having been properly positioned and secured by the user. While the measurements and cutting take place on the second neck 502b and body 510b, the user may remove the completed first neck 502a and body 510a from the nest 400a, and load a new neck 502a and body 510a into the nest 400a. The constituents of each nest 400a and 400b are identical, just configured to the orientation of the nest 400a and 400b.

The invention also features computer readable media. A computer readable medium may comprise executable code for causing a programmable processor to cause the probe 180 to measure portions of the guitar neck 502, including the neck heel 504, the finger board 506 and the rough-cut male portion 508 of the dovetail joint 508, 518, and to measure portions of the guitar body 510, including the front surface 512, the shoulder 514, and the female portion 518 of the dovetail joint. A computer readable medium may comprise executable code for causing a programmable processor to cause the face probe 454 to measure portions of the front face 512 of the guitar body 510. A computer readable medium may comprise executable code for causing a programmable processor to cause the nest actuator 478 to adjust the angle of the nest 400 and the guitar body 510 during cutting. A computer readable medium may comprise executable code for causing a programmable processor to calculate aspects of the geometry and surface features of the neck 502 and body 510, including whether the front face 512 is flat, concave, or convex, neck angle deviations from a threshold angle, finger board 506 thickness, angle of perpendicularity or angle of non-perpendicularity of the male portion 508 of the dovetail joint 508, 518 to the finger board 506, the dimensions of the finger board 506 and heel 504, the top drop angle, and horizontal position of the shoulder, among others. A computer readable medium may comprise executable code for causing a programmable processor to cause the first router 120, the second router 130, and the third router 140 to cut/rout portions of the front face 512 and shoulder 514 of the guitar body 510 in order to create a finely-cut female portion of a dovetail joint 508, 518 according to the unique geometry, shapes, dimensions, angles, imperfections, and other surface features measured from a neck 502 and body 510 set.

A computer readable medium may comprise executable code for causing a programmable processor to carry out an operational logic used in operation of the system 10 that enables measurement of the neck 502, body 510, and front surface 512, calculation of dimensions of and/or needed for the male portion 508 and female portion 518 of the dovetail joint, and positioning and movement of the nest 400 and the body 510 and of each of the first router 120, second router 130, and third router 140 for making cuts in the wood. A computer readable medium may comprise executable code for causing a programmable processor to carry out the operational logic of FIGS. 15-24. The computer readable media may comprise a processor, which may be a computer processor.

The invention provides methods for cutting a dovetail joint 508, 518 on a guitar neck 502 and guitar body 510. The methods are preferably carried out using a system 10 as described or exemplified in this specification. The methods preferably create a dovetail joint 508, 518 as described or exemplified in this specification. Thus, a dovetail joint 508, 518 produced according to a method for cutting a dovetail joint 508, 518 is within the scope of the invention. The dovetail joint 508, 518 produced according to such a method may be comprised in a guitar body 510 or a guitar neck 502, and may be comprised in an assembled guitar. A guitar body 510 comprising a dovetail joint 508, 518 produced according to the methods is provided. A guitar neck 502 comprising a dovetail joint 508, 518 produced according to the methods is provided. A guitar comprising a dovetail joint 508, 518 produced according to the methods is provided.

In general, the methods comprise the steps (carried out in any order) of determining if the bridge locus on the front face of a guitar body 510 is flat, concave, or convex, determining if the neck angle between the heel 504 and the finger board 506 of a guitar neck 502 deviates from a threshold angle, determining the thickness of the lower portion of the finger board 506 of the guitar neck 502, determining whether the angle of a dovetail joint 508, 518 on the heel 504 is perpendicular or non-perpendicular to the finger board 506 of the guitar neck 502, determining the geometry of the finger board 506 and the heel 504, determining the top drop angle on the guitar body 502, and determining the horizontal position of the shoulder 514 of the guitar body 510.

In some aspects, any one or a plurality, including all, of the determining steps may be carried out using a processor programmed to carry out the determining step. Thus, for example, determining if the bridge locus on the front face of a guitar body 51 is flat, concave, or convex may be carried out using a processor programmed to determine if the bridge locus is flat, concave, or convex. Determining if the neck angle between the heel 504 and the finger board 506 of a guitar neck 502 deviates from a threshold angle may be carried out using a processor programmed to determine neck angle deviations from a threshold angle. Determining the thickness of the lower portion of the finger board 506 of the guitar neck 502 may be carried out using a processor programmed to determine the thickness of the finger board 506 of the guitar neck 502. Determining whether the angle of a dovetail joint 508, 518 on the heel 504 is perpendicular or non-perpendicular to the finger board 506 of the guitar neck 502 may be carried out using a processor programmed to determine the perpendicularity or non-perpendicularity of an angle of a dovetail joint 508, 518. Determining the geometry of the finger board 506 and the heel 504 may be carried out using a processor programmed to determine the geometry of the finger board 506 and heel 504. Determining the top drop angle on the guitar body 502 may be carried out using a processor programmed to determine the top drop angle. Determining the horizontal position (including determining low spots) of the shoulder 514 of the guitar body 510 may be carried out using a processor programmed to determine the horizontal position of the shoulder. The processor may be a computer processor, and may be comprised within a computer.

Following the determining steps, the methods may further comprise cutting a finger board pocket on the front face of the guitar body taking into account the geometry, and optionally the depth, of the finger board, cutting a heel pocket on the shoulder of the guitar body taking into account the shape of the bridge portion, the neck angle, the top drop angle, the presence of low spots on the shoulder, the fingerboard thickness, and the geometry of the heel, and, cutting a dovetail joint in the shoulder of the guitar body taking into account the angle of the dovetail joint on the heel.

In some detailed aspects, the methods comprise cutting the heel pocket on the shoulder at a forward angle if the bridge locus is concave, or cutting the heel pocket at a backward angle if the bridge locus is convex. In some detailed aspects, the methods comprise cutting the heel pocket on the shoulder at a forward angle if the neck angle is greater than the threshold angle, or cutting the heel pocket on the shoulder at a backward angle if the neck angle is less than the threshold angle. In some detailed aspects, the methods comprise cutting the heel pocket on the shoulder at a forward angle if the finger board thickness is greater than a nominal thickness, or cutting the heel pocket on the shoulder at a backward angle if the finger board thickness is less than a nominal thickness. In some detailed aspects, the methods comprise cutting the opposite side of the dovetail angle at ½ the distance of non-perpendicularity if the angle of the dovetail joint on the heel is not perpendicular to the finger board of the guitar neck. In some detailed aspects, the methods comprise cutting the heel pocket on the shoulder at a backward angle if the top drop angle is less than a nominal angle, or cutting the heel pocket on the shoulder at a forward angle if the top drop angle is greater than the nominal angle. In some detailed aspects, the methods comprise cutting the shoulder of the guitar body equal to the depth of the lowest low spot.

A dovetail joint 508, 518 at the junction of a guitar neck 502 and a guitar body 510 produced according to the methods is also provided. A guitar body 510 having a female portion 518 of a dovetail joint produced according to the methods is also provided.

Although illustrated and described above with reference to certain specific embodiments and examples, the invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

We claim:

1. A guitar neck-joint routing system, comprising:
   (a) a probe and router assembly comprising a gantry, a probe, and a plurality of routers;

(b) a guitar neck and body nest comprising a guitar body clamp, an upper guitar neck clamp, a lower guitar neck clamp, a face probe, and a nest actuator; and, (c) a programmable logic controller comprising a human machine interface, a programmable processor, and memory.

2. The guitar neck-joint routing system of claim 1, wherein the gantry comprises an upper track and a lower track, a hoist track, a gantry actuator for moving the probe and router assembly laterally along the upper track and lower track, a hoist, and a hoist actuator for moving the probe and router assembly vertically along the hoist track.

3. The guitar neck-joint routing system of claim 1, wherein the probe is mounted on a probe shuttle that is mounted on a probe track, wherein the probe comprises a sensor tip for measuring the geometry and surface features of a guitar neck and a guitar body, a probe processor in communication with the sensor tip and the programmable logic controller, a probe plane actuator for moving the probe about a surface on the guitar neck and about a surface on the guitar body.

4. The guitar neck-joint routing system of claim 1, wherein each of the routers is mounted on a router shuttle that is mounted on a router track, and wherein each of the routers comprises a cutting tool and a router processor in communication with the programmable logic controller.

5. The guitar neck-joint routing system of claim 1, wherein the body clamp comprises a body platen, an upper guitar neck platen, an upper guitar neck guide pin, a lower guitar neck platen, a lower guitar neck guide pin, a plurality of vacuum grips each comprising a vacuum source, and a guitar neck joint locator comprising at least one neck joint locator pin.

6. The guitar neck-joint routing system of claim 1, wherein the upper guitar neck clamp comprises an upper neck clamp slide slidably connected to an upper neck bracket.

7. The guitar neck-joint routing system of claim 1, wherein the lower guitar neck clamp comprises a lower neck clamp slide slidably connected to a lower neck bracket.

8. The guitar neck-joint routing system of claim 1, wherein the face probe comprises a face probe sensor tip for measuring the geometry and surface features of the front face of the guitar body, and a face probe processor in communication with the face probe sensor tip and the programmable logic controller.

9. The guitar neck-joint routing system of claim 1, wherein the nest actuator is capable of moving or pivoting the guitar neck and body nest to an angle calculated by the programmable logic controller for cutting a fingerboard pocket on the front face of the guitar body, cutting a heel pocket into the shoulder of a guitar body, and cutting a dovetail into the shoulder of a guitar body.

10. The guitar neck-joint routing system of claim 1, wherein the programmable logic controller comprises executable code for causing a programmable processor to cause the probe to measure the geometry and surface features of a guitar neck and a guitar body, executable code for causing a programmable processor to cause the face probe to measure the geometry and surface features of the front face of the guitar body, and executable code for causing a programmable processor to cause the plurality of routers to cut portions of the guitar body to create a dovetail joint according to the measurements of the geometry and surface features of the guitar neck and guitar body.

* * * * *